United States Patent
Rosenthal et al.

(10) Patent No.: US 12,373,012 B1
(45) Date of Patent: Jul. 29, 2025

(54) METHODS AND APPARATUS RELATING TO THE SUPPLY OF POWER TO POWER OVER ETHERNET DEVICES

(71) Applicant: Juniper Networks, Inc., Sunnyvale, CA (US)

(72) Inventors: Joshua Rosenthal, San Jose, CA (US); John James Musante, Holtsville, NY (US); Oscar S. Ernohazy, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/809,782

(22) Filed: Jun. 29, 2022

Related U.S. Application Data

(63) Continuation of application No. 17/196,439, filed on Mar. 9, 2021, now Pat. No. 11,385,695, which is a
(Continued)

(51) Int. Cl.
| | |
|---|---|
| *G06F 1/26* | (2006.01) |
| *G06F 1/32* | (2019.01) |
| *G06F 1/3206* | (2019.01) |
| *H04L 12/10* | (2006.01) |
| *H04L 12/40* | (2006.01) |

(52) U.S. Cl.
CPC ............ *G06F 1/266* (2013.01); *G06F 1/3206* (2013.01); *H04L 12/10* (2013.01); *H04L 12/40045* (2013.01)

(58) Field of Classification Search
CPC ....... G06F 1/266; G06F 1/3206; H04L 12/10; H04L 12/40045
See application file for complete search history.

(56) References Cited

U.S. PATENT DOCUMENTS

| 8,010,820 B1 | 8/2011 | Gilbrech et al. |
| 10,976,791 B2 | 4/2021 | Rosenthal et al. |
(Continued)

OTHER PUBLICATIONS

Prosecution History from U.S. Appl. No. 16/287,853, now issued U.S. Pat. No. 10,976,791, dated Aug. 13, 2020 through Feb. 2, 2021, 68 pp.

(Continued)

*Primary Examiner* — Stefan Stoynov
(74) *Attorney, Agent, or Firm* — Shumaker & Sieffert, P.A.

(57) ABSTRACT

An access point, which is a Power over Ethernet (PoE) Powered Device (PD) measures input voltage and input current. The access point determines a power requirement of the access point based on the measured current, measured voltage, and information about power requirements of access point components or devices coupled to the access point a power requirement of the access point. The access point communicates the determined power request to a power sourcing equipment (PSE), e.g., a network switch in some embodiments, the access point further communicates one of measured input current and measured input voltage to the PSE. The PSE uses the information received from the access point, e.g., power request and power measurements to determine an amount of power to be granted to the access point. If the access point does not receive the requested power level the access point selects internal components and/or external devices to de-power.

18 Claims, 10 Drawing Sheets

Related U.S. Application Data continuation of application No. 16/287,853, filed on Feb. 27, 2019, now Pat. No. 10,976,791.

(56) References Cited

U.S. PATENT DOCUMENTS

| | | |
|---|---|---|
| 11,385,695 B2 | 7/2022 | Rosenthal et al. |
| 2007/0254714 A1 | 11/2007 | Martich et al. |
| 2009/0222678 A1 | 9/2009 | Yu et al. |
| 2010/0211806 A1 | 8/2010 | Diab et al. |
| 2013/0339760 A1* | 12/2013 | Zimmerman ........... H04L 12/10 713/300 |
| 2017/0279273 A1 | 9/2017 | Tischer |
| 2017/0347319 A1 | 11/2017 | Lam |
| 2020/0274724 A1 | 8/2020 | Rosenthal et al. |

OTHER PUBLICATIONS

Prosecution History from U.S. Appl. No. 17/196,439, now issued U.S. Pat. No. 11,385,695, dated Dec. 8, 2021 through Mar. 17, 2022, 15 pp.

\* cited by examiner

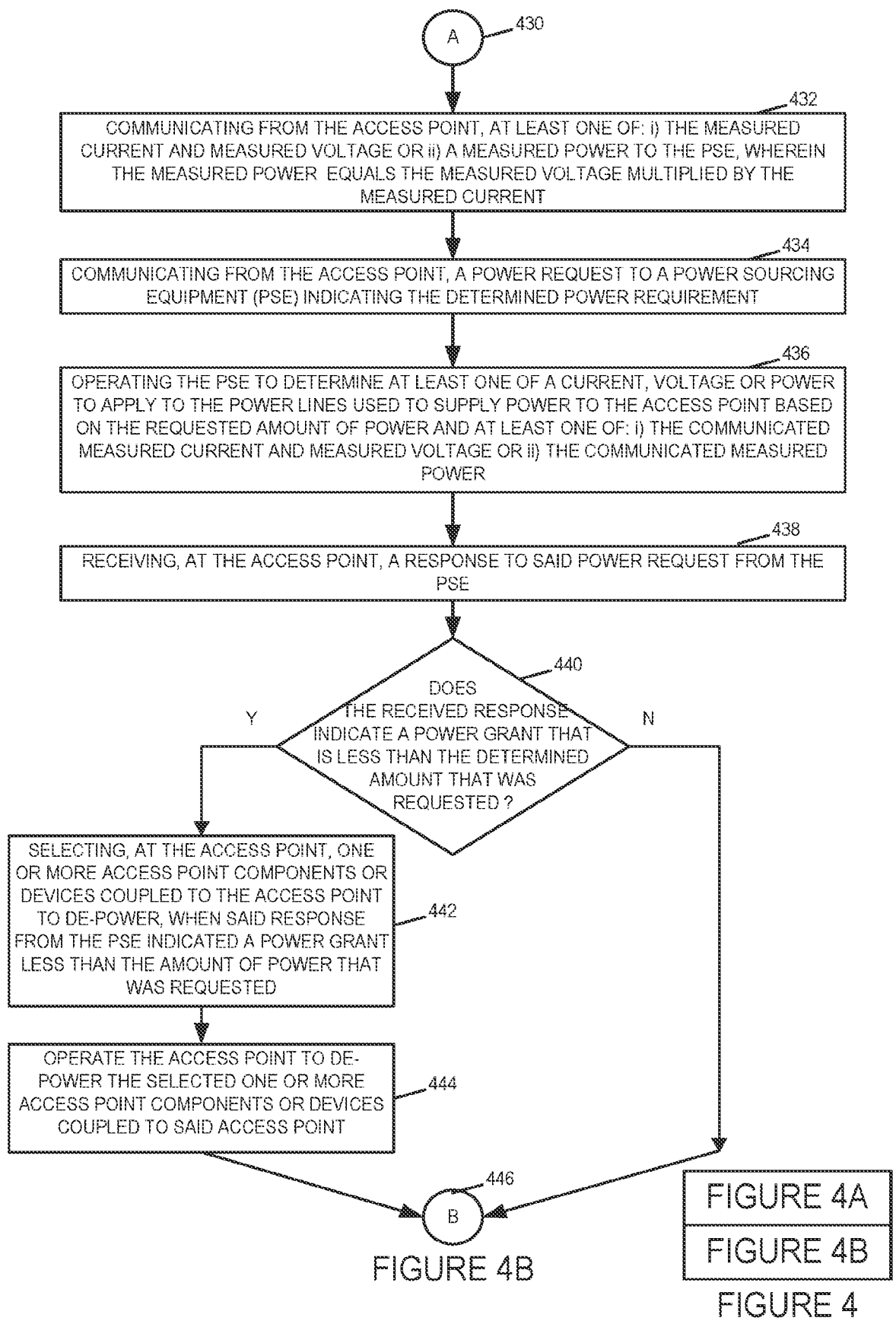

METHODS AND APPARATUS RELATING TO THE SUPPLY OF POWER TO POWER OVER ETHERNET DEVICES

This application is a continuation of U.S. patent application Ser. No. 17/196.439, filed 9 Mar. 2021, which is a continuation of U.S. patent application Ser. No. 16/287.853, filed 27 Feb. 2019, and issued as U.S. Pat. No. 10,976,791, each of which is incorporated by reference herein in its entirety.

FIELD

The present application relates to communications systems, and more particularly, method and apparatus related to the supply or power to Power over Ethernet access points.

BACKGROUND

Various standards relate to the supply of power over Ethernet lines in accordance with such systems at least two lines in a cable are normally used to supply power to a device. The device being powered is often referred to as a Powered Device (PD) with the device supplying the power sometimes being referred to as a Power Sourcing Equipment (PSE).

The distance between a PD, such as an Access Point (AP), and a PSE, e.g., switch, may vary from one PD to another This makes the delivery of power to the PD, somewhat unpredictable given that the line loss is unknown. While voltage and/or power may be monitored at a PSE, the actual amount of power delivered to the PD is not reliably known to the PSE due to line loss and/or other operating conditions that may affect the amount of power reaching the PD(s) or to which power is being supplied.

Not only is the unpredictable nature of power loss during transmission a factor in the amount of power that may have to be supplied to a pair of power lines connected to the PD, the amount of power required by a PD will vary from time to time based on a variety of factors such as temperature or features in use on the PD.

In order to ensure that PDs attached to a PSE receive adequate power, the PDs often request more power than they actually need or are provisioned based on the assumption that the PDs will require more power than they will actually need. By providing PDs power based on worst case expectations the number of PDs that can be supplied at a given time may be less than could otherwise be supported and/or some PDs are denied power which they could use, e.g., they are lower priority PDs than PDs which are being over provisioned with power based on the lack of reliable power requirement information In view of the above discussion it should be appreciated that there is a need for methods and apparatus for reliability determining power needs and/or communicating power needs to Power Sourcing Equipment (PSE) supplying power in an Ethernet system.

SUMMARY

In various embodiments, sensors are provided within PDs to measure power needs for determining information which can be communicated to a PSE and be used in determining line loss and/or transmission loss so that such losses can be factored into making power supply decisions.

In some embodiments, PDs include a voltage sensor, e.g. a voltmeter, that is used to measure a voltage across a sense resister that is connected to a PoE power input. Based on the measured voltage drop across the sense resistor and the known value of the sense resistor, the input current to the PD is determined. Voltage is also measured on the P) PoE power input, e.g., the input line voltage at the PD is determined. In embodiments, input power is determined in the PD using the measured current and measured voltage. In some embodiments, a temperature sensor is also included in the PDs allowing for temperature measurements at the PDs. The PDs include detectors which may be included in a processor, or external to a processor, for detecting peripheral devices coupled to the PD.

In some but not necessarily all embodiments the measured input current, and measured input line voltage and/or temperature measured at the PD is provided to a processor in the PD. The processor controls the reporting of these measurements to the PSE along with power requests. The processor in the PD determines the amount of power to be required for a given time period based on the detected peripheral devices coupled to the PD, the detected input voltage, the detected input current, and when measured, the detected temperature. In cases where the PD is a wireless device such as an AP, the required amount of power may be and sometimes is determined based on a number of transmitters and/or receives to be powered during a given time period. The number of transmitters and/or receives to be powered during a given time period may be determined based on a traffic load, e.g., the amount of traffic to be transmitted to devices and/or received from devices.

After determining the amount of power to be requested, the PD sends a request to the PSE for the requested amount of power, e.g., a number of watts. The measured input line voltage, current, and/or temperature at the PD may be communicated with the PoE power request or separately from the PoE power request.

The PSE, e.g., a PoE switch, receives the PoE power request from one or more PDs and, in some cases, the measured line voltage, current, and/or temperature at the requesting device. The PSE takes into consideration the received measurement information, e.g., voltage at the PD, current at the PD, and/or temperature In some embodiments the PSE estimates the amount of power loss to the device due to transmission loss and takes this into consideration when determining the amount of power to be supplied to the requesting device. For example, the amount of power expected to be lost due to transmission may be added to the amount of power requested when determining the requesting PDs actual power needs.

Based on the amount of power available at the PSE, the requested amount of power and reported measurement information from one or more PDs, the PSE determines the amount of power to be provided to individual PDs requesting power. In some cases, depending on the priority of the device and/or the number of devices requesting power, the PSE may or may not grant a PD all the power it is requesting The amount of power granted to individual PDs is communicated from the PSE to the PDs to which power grants are made. The power grant may, and in some embodiments does, not take into consideration the amount of power the PD allocated to transmission loss The amount of power indicated as being granted to a PD that is subject to a large transmission loss may be lower, e.g., one or several watts lower, than the actual amount of power allocated by the PSE. In this way PDs can make power requests based on their actual expected needs, potentially plus some safety factor, without having to worry if they will suffer from extensive transmission power loss due to whether they are connected to the PSE by a short or long set of lines.

A PD which receives a power grant that is less than a requested amount may, and in some embodiments does select peripheral devices and/or components in) the PD to de-power or operate at reduced power so that its operation stays within the allocated amount of power. For example, a PD, which is an AP, may choose to de-power a camera attached to the AP or de-power one or more receivers or transmitters in the AP to avoid using more than the allocated amount of power.

The voltage, current, and/or temperature measuring steps may be performed periodically, e.g., every 30 seconds, based on some sort of schedule or as power requirements or measured values change. By providing a PSE such as a PoE switch with information about the voltage, current, and/or temperature at the PD to which power is being supplied, the PSE can make more accurate determinations of the amount of required power to a requesting PD and/or increase the reliability of the system by supplying the amount of power needed to overcome transmission losses to devices which may be located at any of a variety of different distances away from the PSE, A exemplary method, in accordance with some embodiments, comprises, measuring, in an access point, an input current for the access point; measuring, in the access point, a voltage on a Power Over Ethernet (PoE) power input of the access point, determining, in the access point, based on the measured current, measured voltage, and information about power requirements of access point components or devices coupled to the access point a power requirement of the access point, said power requirement being an amount of power to be requested; and communicating, from the access point, a power request to a Power Sourcing Equipment (PSE) indicating the determined power requirement.

An exemplary access point, in accordance with some embodiments, comprises: a plurality of wireless interfaces; a Power over Ethernet (PoE) power input; one of a: current sense resistor or an inductive current sensor for measuring the input current to the access point provided via the POE power input; a voltage measurement device for measuring at least one of: i) a voltage on a Power Over Ethernet (PoE) power input of the access point or ii) a voltage drop across said sense resistor; a processor configured to determine, in the access point, based on the measured current, measured voltage, and information about power requirements of access point components or devices coupled to the access point a power requirement of the access point, said power requirement being an amount of power to be requested, and an interface for communicating, from the access point, a power request to a Power Sourcing Equipment (PSE), the power request indicating the determined power requirement.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional features and embodiments are discussed in the detailed description which follows.

BRIEF DESCRIPTION OF THE FIGURES

FIG. 4B is a second part of an exemplary method of operating a communications system including a wireless access point coupled to a PSE via a PoE cable, in accordance with an exemplary embodiment, said exemplary method including power control related operations FIG. 4 comprising the combination of FIG. 4A and FIG. 413.

DETAILED DESCRIPTION

Figure 1:
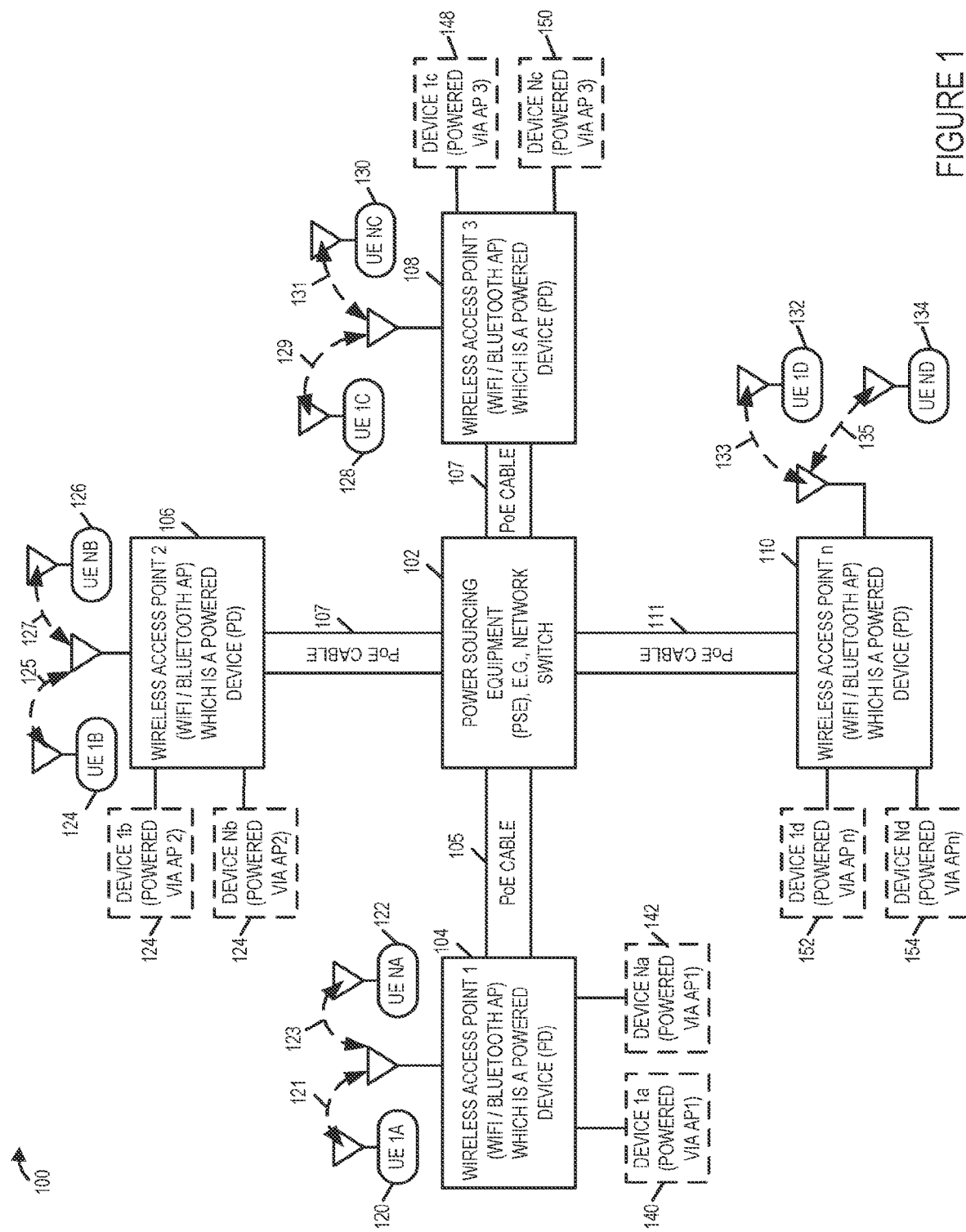
FIG. 1 is a drawing of an exemplary communications system including a Power Sourcing Equipment (PSE), a plurality of wireless access points (APs), each AP coupled to the PSE via a Power over Ethernet (PoE) cable, and a plurality of user equipment (UE) devices, in accordance with an exemplary embodiment.

FIG. 1 is a drawing of an exemplary communications system 100 including a Power Sourcing Equipment (PSE) 102, e.g., a network switch, a plurality of wireless access points (APs) (104, 106, 108, . . . 110), each AP coupled to the PSE 102 via a Power over Ethernet (PoE) cable, and a plurality of user equipment (UE) devices, in accordance with an exemplary embodiment. The plurality of wireless access points include wireless access point 1 104, wireless access point 2 106, wireless access point 2 106, wireless access point 3 108, and wireless access point n 110 In the exemplary system 100 of FIG. 1, each of the wireless access points (104, 106, 108, 110) is a WiFi/Bluetooth, e.g., Bluetooth Low energy, access point, which is an Ethernet Powered Device (PD). In some embodiments, different APs coupled to the PSE 102 have different capabilities. e.g., different types of radios, different numbers of radios, different external ports for powering additional powered devices and/or different power requirements.

Wireless access point 1104 is coupled to PSE 102 via Power over Ethernet (PoE) cable 105. Wireless access point 2 106 is coupled to PSE 102 via Power over Ethernet (PoE) cable 107 Wireless access point 3 108 is coupled to PSE 102 via Power over Ethernet (PoE) cable 109. Wireless access point n 110 is coupled to PSE 102 via Power over Ethernet (PoE) cable 111. In some embodiments, at least some of the PoE cables (105, 107, 109, 111) are different lengths.

System 100 includes a plurality of user equipment (UE) devices including (UE 1A 120, UE NA 122. UE 1B 124, UE NB 126, UE 1C 128, UE NC 1 130, UE 1D 132, UE ND 134). At least some of the UEs (120, 122, 124, 126, 128, 130, 132, 134) are wireless device which may move around the communications system and be connected to different wireless access points at different times. In the example of FIG. 1, UE 1A 120 and UE NA 122 are shown as being coupled to wireless access point 1 104 via wireless links 121, 123, respectively. In the example of FIG. 1, UE 1B 124 and UE NB 126 are shown as being coupled to wireless access point 2 106 via wireless links 125, 127, respectively. In the example of FIG. 1, UE 1C 128 and UE NC 130 are shown as being coupled to wireless access point 3 108 via wireless links 120, 131, respectively in the example of FIG. 1, UE 1D 132 and UE ND 134 are shown as being coupled to wireless access point 4 110 via wireless links 133, 135, respectively.

There may be; and sometimes are one or more external devices connected to an access point which can be, and sometimes are powered, e.g., conditionally powered, by the access point. One or more of external devices (device 1*a* 140, device Na 142) may be, and sometimes are, connected to AP 1 104, and powered, e.g., conditionally powered, by AP 1 104. One or more of external devices (device 1*b* 144, . . . , device Nb 146) may be, and sometimes are, connected to AP 2 106, and powered, e.g., conditionally powered, by AP 2 106. One or more of external devices (device 1*c* 148, . . . , device Nc 150) may be, and sometimes are, connected to AP 3 108, and powered, e.g., conditionally powered, by AP 2 106. One or more of external devices (device 1*d* 0.152, . . . , device Nd 154) may be, and sometimes are, connected to AP n 110, and powered, e.g., conditionally powered, by AP n 110

In the exemplary system 100 of FIG. 1, at least one of the wireless access points (104, 106, 108, 1101) includes the capability to measure input current, measure input voltage, determine, based on the measured current, measured voltage and information about power requirements of access point components or devices coupled to the access point, a power requirement of the access point, and communicate a power request to a Power Sourcing Equipment (PSE) indicating the determined power requirement. In some such embodiments, the access point further communicates: i) measured input voltage and measured input current, or ii) measured input power, to the PSE, which allocates power grants to the access point based on information received from the access point.

Figure 2:
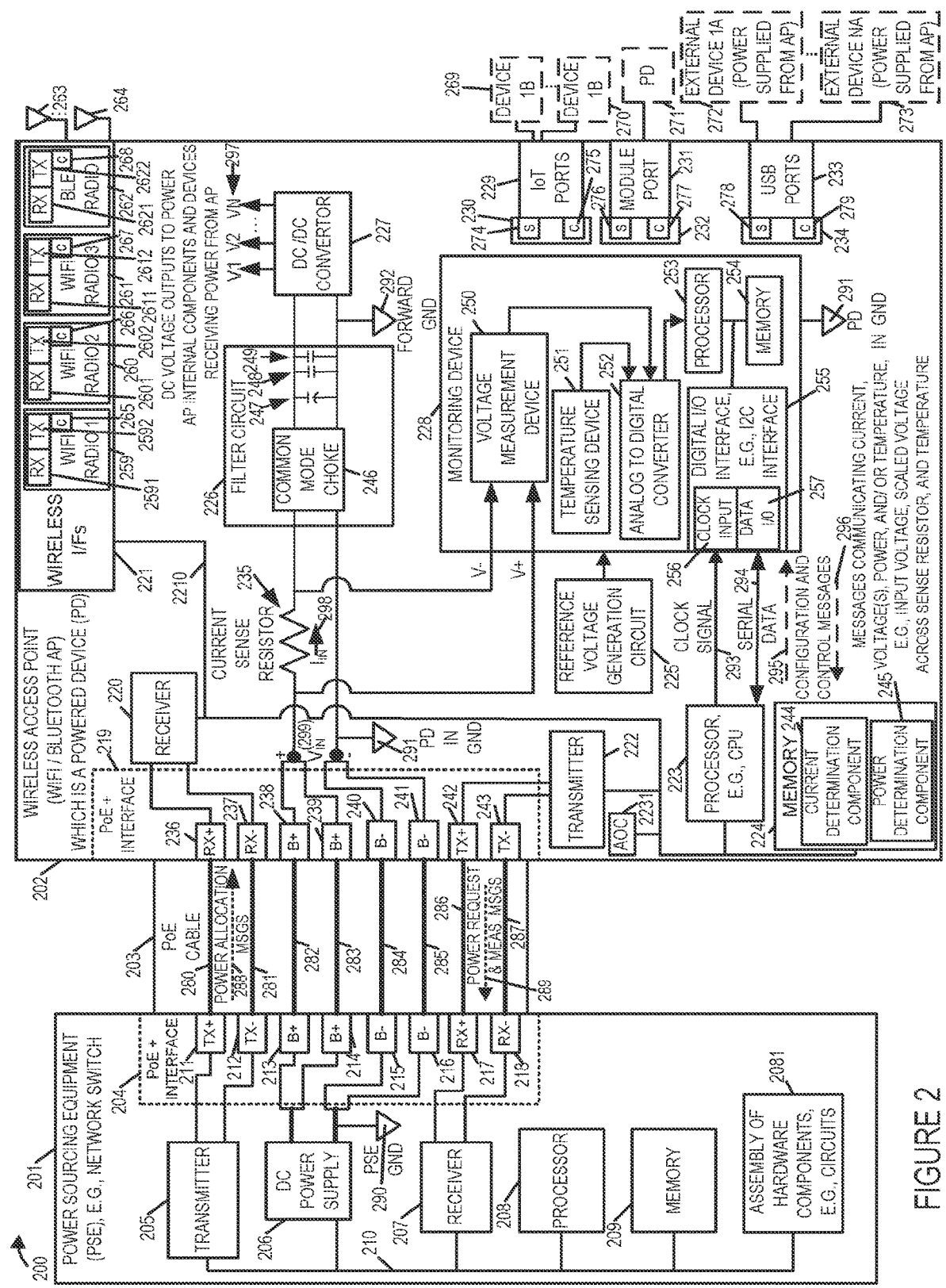
FIG. 2 is a drawing of a portion of an exemplary communications system including a power sourcing equipment (PSE) coupled to a wireless access point (AP) via a Power over Ethernet (PoE) cable, in accordance with an exemplary embodiment, said wireless access point implemented to measure access point input current using a sense resistor, determine an amount of power to be requested based on the measured current, and communicate a power request to the PSE.

FIG. 2 is a drawing of a portion 200 of an exemplary communications system including a power sourcing equipment (PSE) 201, e.g., a network switch, coupled to a wireless access point (AP) 202, e.g. a WiFi/Bluetooth AP, which is a powered device (PD), via a Power over Ethernet (PoE) cable 203. In one exemplary embodiment PSE 204 of FIG. 1 is PSE 102 of FIG. 1, wireless access point 202 of FIG. 2 is one of the wireless APs (102, 104, 106, 110) of FIG. 1, and PoE cable 203 of FIG. 2 is a corresponding one of the PoE cables (105, 107, 109, 111) of FIG. 1, respectively.

PSE 201 includes a PoE plus (PoE+) interface 204, a transmitter 205, a DC power supply 206, a receiver 207, a processor 208, an assembly of hardware components 2081, e.g., an assembly of circuits, and memory 200 The transmitter 205, DC power supply 206, receiver 207, processor 208, assembly of components 2081 and memory 20M, are coupled together via a bus 210, over which the various components may exchange data and information. PoE+ interface 204 includes TX+ connection point 211, a TX− connection point 212, a first B+ connection point 213, a second B− connection point 214, a first B− connection point 215, a second B− connection point 216, a RX 4 connection point 217 and a RX− connection point 218 The TX+/TX− connection point pair (211, 212) is coupled to the transmitter 205. The two B+ connection points (213, 214) are coupled together and connected to a high side output of DC power supply 206. The two B− connection points (214, 215) are coupled together and connected to a low side output of DC power supply 206, which is connected to PSE ground 290.

Wireless AP 202 includes PoE+ interface 219, receiver 220, wireless interfaces (1/Fs) 221, transmitter 222, processor 223, e.g., a CPU, an assembly of components (AOC) 22 1, e.g. an assembly of hardware components, e.g., circuits, and memory 224. Memory 224 includes a current determination component 224, e.g. a current determination routine, and a power determination component 245, e.g., a power determination routine. The receiver 220, wireless interfaces (1/Fs) 221, transmitter 222, processor 223, and memory 224 are coupled together via a bus 2210 over which the various elements may interchange data and information. Wireless AP 202 further includes a sense resistor 235, a filter circuit 226, Dc/DC convertor 227, monitoring device 228, and a reference voltage generation circuit 225, coupled together as shown in FIG. 2. Filtering circuit 226 includes a common mode choke 246, and capacitors 247, 248, 249.

Monitoring device 228, e.g., an integrated circuit chip, includes a voltage measurement device 250, a temperature sensing device 251, an analog to digital converter 252, a processor 253, memory 254 and a digital I/O interface 255, e g., a 12C interface, coupled together as shown in FIG. 2 The digital I/O interface includes a clock input 256, and a Data input/output (110) 257. In some embodiments, monitoring device 228 is, e.g., an integrated circuit chip such as, e.g., a high-side current sense amplifier with an Analog-to-Digital Converter (ADC) and Operational amplifier (Op Amp) and gain block.

Wireless 4/Fs 221 includes four wireless radios (WiFi radio 1 259, WiFi radio 2 260, WiFi radio 3 261, Bluetooth Low Energy (BLE) radio 262). In some embodiments, each wireless radio (259, 260, 261, 262) is considered a wireless interface. WiFi radio 1 259, e.g., a 2.4 GHz radio, includes a wireless receiver 2591, a wireless transmitter 2592 and power control circuitry 255. WiFi radio 2 260, e.g., a 5 GHz radio, includes a wireless receiver 2601, a wireless transmitter 2602 and power control circuitry 266. WiFi radio 3 261L e.g., a dual band radio, includes a wireless receiver 2611, a wireless transmitter 2612 and power control circuitry 267 BLE radio 262 includes a wireless receiver 2621, a wireless transmitter 2622 and power control circuitry 268

At different times different sets of wireless radios or different sets of transmitters of the wireless radios may be powered on (energized) or powered off (de-energized). Each of the radios (259, 260, 261, 262) of the wireless interface 221 may be, and sometimes is, coupled to one or more of a plurality of antenna (antenna 1 263, antenna M 264), via which the receivers (2591, 2601, 2611, 2621), respectively, may receive wireless signals, e.g., from UE devices. Each of the radios (259, 260, 261, 262) of the wireless interfaces 221, may be, and sometimes is, coupled to one or more of the plurality of antenna (antenna 1 263 . . . . , antenna M 264), via which the transmitters (2592, 2602, 2612, 2622), respectively may transmit wireless signals, e.g., to U-E devices. Different WiFi radios may, and sometimes do, use different antennas. In some embodiments, different antennas are used for transmit and receive In some embodiments, at least some of the WiFi radios (259, 260, 261, 262) support MIMO operations. In some embodiments, wireless radios, wireless radio transmitters, and/or MIMO circuitry can be, and sometimes are, selectively de-energized to reduce power. e.g., via power control circuitry (265, 266, 267, 268), e.g., under the direction of processor 223.

PoE+ interface 219 includes RX+ connection point 236, a RX– connection point 237, a first B+ connection point 238, a second B+ connection point 239, a first B– connection point 240, a second B– connection point 241, a TX+ connection point 24:2 and a TX, connection point 243. The RX+/RX– connection point pair (236, 237) is coupled to the receiver 220. The two B+ connection points (238, 239) are coupled together and connected to an input side of current sense resistor 235. The output side of the current sense resistor 235 is connected to an input high side of the common mode choke 246 of the filter circuit. The two B– connection points (240, 241) are coupled together and connected to a Power Device (PD) ground (GND) 291 and to an input low side of the common mode choke 246 of the filter circuit. The Hi side output of the common mode choke is connected to the Hi side input of the DC/DC converter 227. The low side output of the common mode choke 246 is connected to forward ground 292 and to the low side input of the Dc/DC convertor. The DC/DC converter 227 generates a plurality of DC voltages (V1, V2, . . . VN) 297 which are output to power the wireless access points internal components and devices, external to the wireless access point, which are being powered by the wireless access point, e.g., USB powered devices, Internet of Things (IoT) devices, and/or an additional PoE Powered Device, e.g., another wireless base station or another type of PoE PD.

Wireless access point 202 further includes Internet of Things (IoT) ports 229 coupled to IoT port circuitry 230. IoT port circuitry 230 includes detection circuitry 230, sometimes referred to as sense (S) circuitry, for detecting: one of more of the following: i) if one or more IoT devices are connected to the IoT ports, ii) the number of IoT connected devices, iii) information used to identify and/or characterize the type of device detected, e.g., in terms of power draw, or iv) a measured level of power draw. IoT port circuitry 230 further includes power control circuitry 275, e g, activating or de-activating a IoT device, e.g., de-powering a connected IoT device, under control of processor 223 to reduce power draw. One or more IoT devices (device 1B 269, . . . , device NB 270) may, be and sometimes are coupled to the access point 202 via IoT ports 229.

Wireless access point 202 further includes a module ports 23 1 coupled to module port circuitry 232. Module pot circuitry 232 includes detection circuitry 276, sometimes referred to as sense (S) circuitry, for detecting: one of more of the following: i) if a powered device, e.g., a PoE Powered Device is connected to the module port ii) information used to identify and/or characterize the type of device detected. e.g., in terms of power draw, or iii) a measured level of power draw. Module port circuitry 232 further includes power control circuitry 279, e.g., for activating or de-activating a PD, e.g., de-powering a connected PD, under control of processor 223 to reduce power draw. A PD 271, e g., another PoE access point or another type of PD may, be and sometimes is coupled to the access point 202 via module ports 231.

Wireless access point 202 further includes USB ports 233 coupled to USB ports circuitry 234. USB ports circuitry 234 includes detection circuitry 278, sometimes referred to as sense (S) circuitry, for detecting: one of more of the following, i) if one or more USB devices are connected to the IoT ports, ii) the number of USB connected devices, iii) information used to identify and/or characterize the type of device(s) detected, e.g., in terms of power draw, or iv) a measured level(s) of power draw. USB ports circuitry 234 further includes power control circuitry 279, e g, for activating or de-activating a USB device, e.g., de-powering a connected USB device, under control of processor 223 to reduce power draw. One or more USB devices (external device 1A 272, . . . , external device NA 273) may, be and sometimes are coupled to the access point 202 via USB ports 233.

PoE+ cable 203 includes line 280 which connects TX+ 211 of PSE 201 to RX+ 236 of access point 202. PoE+ cable 203 further includes line 281 which connects TX– 212 of PSE 201 to RX– 237 of access point 202. Power allocation message signals 288, which generated and sent by transmitter 205 of PSE 201, are communicated via cable line pair (280, 2281) of cable 203, to wireless access point 202, and the signals are received by receiver 230 of the access point 202. The receiver 220 communicates the received power allocation message 288 to processor 223

PoE+ cable 203 further includes line 282 which connects B+ 213 of PSE 201 to B+ 238 of access point 202. PoE+ cable 203 further includes line 283 which connects B+ 214 of PSE 20I to B+ 239 of access point 202. PoE+ cable 203 further includes line 284 which connects B– 215 of PSE 201 to B– 240 of access point 202. PoE+ cable 203 further includes line 285 which connects B– 216 of PSE 201 to B– 241 of access point 202. Power is supplied from PS 201 to wireless access point via lines (282, 283, 284, 285), e.g., with 2 lines (282, 283) being the high side and two lines (285, 285) being the Low or return side. In some embodiments, only 2 lines are used to supply power (one B+ line and one B– line), rather than 4 lines. The embodiment with 4 power lines can support higher power levels than the embodiment with only 2 power lines.

The input voltage (VIN) 299 of the wireless access point 202 is shown across the common connection point of B+ 238 and B+ 239 with respect to the common connection point of B– 240 and B– 241. The input voltage (VIN) 299 of the access point 202 is measured by the access point. The input current IN 298, which is the current through current sense resistor 235, is also measured by the access point 202. In this exemplary embodiment, the voltage measurement device 250 of measurement device, receives as inputs V+ and V–, which are sense points one both sides of sense resistor 250 Voltage measurement device 250 measures the voltage drop across sense resistor 235, e.g. (the value of V+ with respect to PD In GND)—(the value of V– with respect to PD In GND). The measured voltage drop across the sense resistor is output from voltage measurement device, e.g., a voltage measurement circuit, and input to ADC 252, where the analog measurement is converted to a digital value. The digital value representing the voltage drop across the sense resistor is input to processor 253. In some embodiments, the monitoring device 228 knows the value of the sensor resistor 235, and computes an input current, e.g., where input current=measured voltage drop across sense resistor/value of the sense resistor. In other embodiments, the monitoring device 228 is not aware of the value of the sense resistor and outputs the measured voltage drop across the sense resistor or a scaled value corresponding to the measured voltage drop across the sense resistor to process or 233, which determines the input current. For example, the CPU 223 retrieves the value of the sense resistor, which is stored in memory, and CPU 223 calculates the value of the input current, where input current=voltage drop across the sense resistor/sense resistor value.

In some embodiments, the voltage measurement device 250 measures the input voltage Vin 299, which is V+ with respect to PD IN CND, directly, outputs, the analog measurement to the ADC 252, which converts it to a digital representation, forwards the result to the processor 253, which sends the measured voltage in a message to CPU 223.

In some embodiments, the voltage measurement device 250 measures an average voltage of V+ and V−, sometimes referred to as an input common mode voltage for device 228, sends the measured average voltage to ADC. 252, where the ADC converts the analog measurement to a digital representation. Then the result is forwarded to the processor 253, which sends the average voltage (common mode input voltage) to CPU 223 in a message. In some embodiments, processor 223 uses the average voltage (common mode input voltage) as a reasonable representation of VIN, since the voltage drop across the sense resistor is relatively small. In other embodiments, the CPU 223 adjusts the received average voltage (common mode input voltage) taking into account the voltage drop across the sense resistor, based on the measured current through the sense resistor and the known value of the sense resistor.

Temperature sensing device 251, e.g., a temperature sensing circuit including a calibrated temperature sensitive component, e.g., resistor with a known resistance vs temperature curve, or a thermocouple, measures the temperature of access point 202 and outputs and analog signal indicative of the measured temperature to ADC 252, which converts the analog signal to a digital representation of the temperature, and sends the digital representation to processor 253. In some embodiments, access point power use increases as temperature increases, e.g., because one or more cooling fans are turned-on and/or operate at a higher on/oft duty cycle ratio.

Clock input 256 of Digital I/O interface 255 receives clock signals 293 from processor 233. Serial data line 294 couples Data I/O 257 of monitoring device 228 to processor 223. Exemplary signals 295 sent from processor 228 to Data I/O 257 over serial I/O 294 include configuration and control messages, e.g., messages selecting types of measurements to be performed, rates of measurements to be performed, scale factors to be used, which messages are to be output, rate of messages to be output, and format of output messages. Exemplary signals 296 sent from data I/O 257 to processor 223 include, e.g., a messages communicating a measured or determined current, a message communicating measured voltage, a message communicating a voltage drop across the sense resistor, a message communicating a common mode input voltage, and a message communicating a measured temperature at the access point.

FIG. 2 has been described for an embodiment in which 4 lines are used for power (two B+ lines and two B− lines). In some embodiments, only two lines are used for power (one B+ line and one B− line). FIG. 2 has been described for an exemplary implementation using PoE+; however, the methods and apparatus described in this application are also well suited for other Power over Ethernet implementations, e.g., an earlier PoE implementation using lower maximum power levels than PoE+, or a newer PoE implementation using higher maximum power levels than PoE+.

Figure 3:
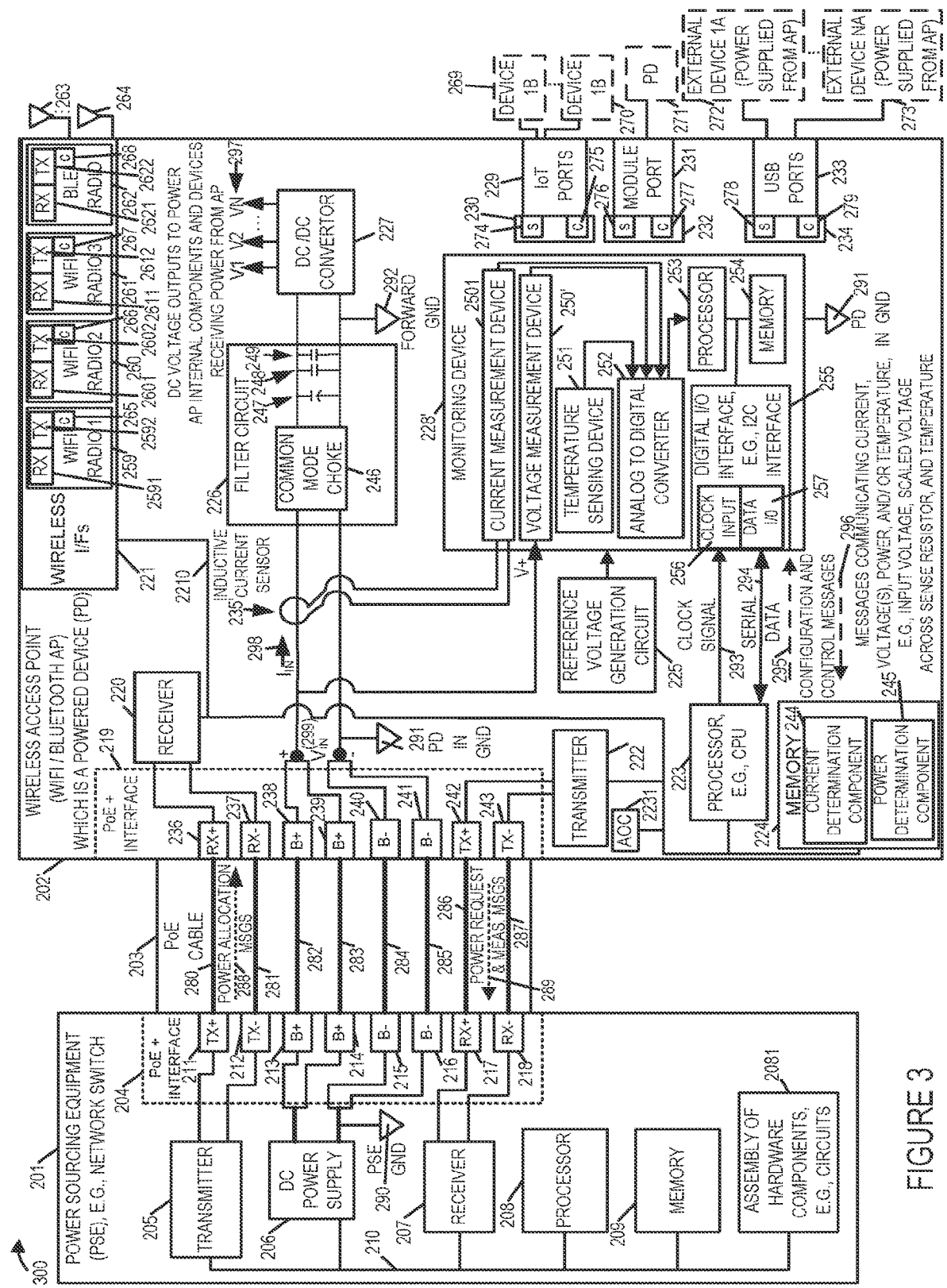
FIG. 3 is a drawing of a portion of an exemplary communications system including a power sourcing equipment (PSE),. e.g., a network switch, coupled to a wireless access point (AP) via a Power over Ethernet (PoE) cable, in accordance with an exemplary embodiment, said wireless access point implemented to measure access point input current using an inductive current sensor, determine an amount of power to be requested based on the measured current determine an amount of power to be requested based on the measured current, and communicate a power request to the PSE.

FIG. 3 is a drawing of a portion 300 of an exemplary communications system including a power sourcing equipment (PSE) 201, e.g., a network switch, coupled to a wireless access point (AP) 202', e.g. a WiFi/Bluetooth AP, which is a powered device (PD), via a Power over Ethernet (PoE) cable 203. In one exemplary embodiment PSE 201 of FIG. 3 is PSE 102 of FIG. 1, wireless access point 202' of FIG. 3 is one of the wireless AI's (102, 104, 106, 110) of FIG. 1, and PoE cable 203 of FIG. 3 is a corresponding one of the PoE cables (105, 107, 109, 111) of FIG. 1, respectively FIG. 3 is similar to FIG. 2; however, wireless access point 202' of FIG. 3 is slightly different from wireless access point 202 of FIG. 2 The difference between access point 202 of FIG. 2 and access point 202' of FIG. 3 will now be described. Access point 202 of FIG. 2 includes a sense resistor 235 and monitoring device 228 performs a voltage drop measurement across sense resistor 235, which is used to measure input current IIN 298. Access point 202' of FIG. 3 does not include sense resistor 235, but rather includes an inductive current sensor 235', e.g. an inductive pick-up, around an input power feed line as shown in FIG. 3, and monitoring device 228' includes a current measurement device 2501, which is coupled to inductive current sensor 235', which determines a current value based on the received signal from the inductive current sensor 235'. The current measurement device 2501 outputs an analog signal indicative of the input current to ADC 252, which converts the analog measurement to a digital value, which is sent to processor 253. Voltage measurement device 250' of monitoring device 228' measures Vin 299 and outputs an analog signal indicative of the measured voltage to the ADC 252, which converts the analog measurement to a digital value, which is sent to processor 253.

Figure 4A:
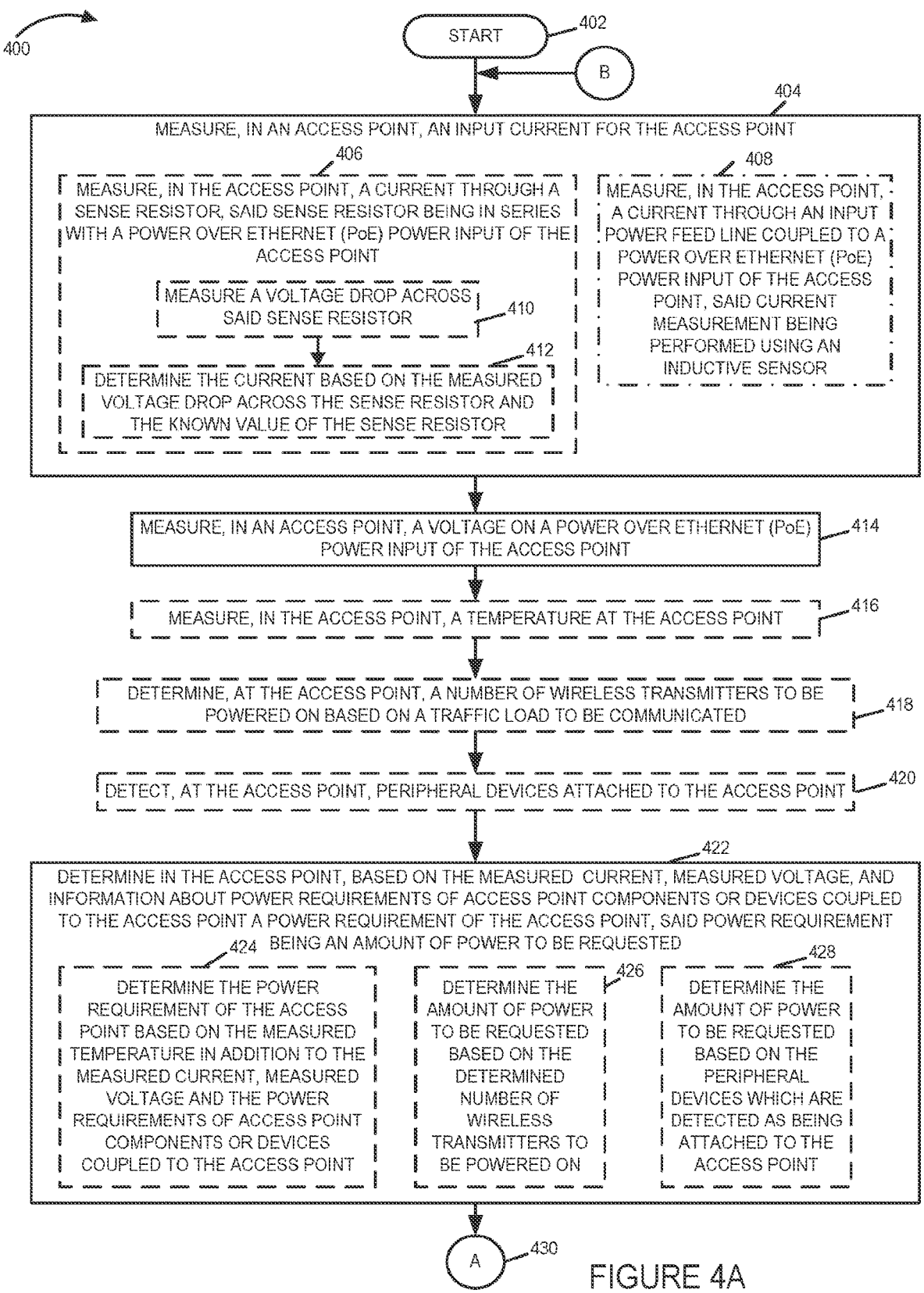
FIG. 4A is a first part of an exemplary method of operating a communications system including a wireless access point coupled to a PSE via a PoE cable, in accordance with an exemplary embodiment, said exemplary method including power control related operations.

FIG. 4, comprising the combination of FIG. 4A and FIG. 413, is a flowchart 400 of an exemplary method, e.g., a method of operating a communications system including a Power Sourcing Equipment (PSE) and an access point which is a Powered Device (PD), in accordance with an exemplary embodiment. Operation starts in step 402 in which the communications system is powered on and initialized. Operation proceeds from step 402 to step 404

In step 404 an access point measures, at the access point, an input current for the access point. In some embodiments, step 404 includes step 406; while in other embodiments, step 404 includes step 408.

In step 406 the access point measures, in the access point, a current through a sense resistor, said sense resistor being in series with a power over Ethernet (PoE) power input of the access point. In some embodiments, step 406 includes steps 410 and 412. In step 410 the access point measures a voltage drop across said sense resistor. Operation proceeds from step 410 to step 412. In step 412 the access point determines the current based on the voltage drop across the sense resistor and the known value of the sense resistor. For example, current (in amps)=measured drop across the sensor resistor (in volts)/value of sense resistor (in ohms).

In step 408 the access point measures, in the access point, a current through an input power feed line coupled to a power over Ethernet (PoE) power input of the access point, said current measurement being performed using an inductive sensor.

Operation proceeds from step 404 to step 414. In step 414 the access point measures, in the access point, a voltage on a power over Ethernet (PoE) power input of the access point. For example, the access point measures the on the B+ power input line with respect to ground (e.g., the B− power input line).

Steps 416, 418, and 420 are optional steps. In some embodiments, one or more or all of steps 416, 418, and 420, are performed. In some embodiments, one or more or all of optional steps 416, 418, and 420 are not performed, and the step is bypassed in the sequence of steps. The flow will now be described for an embodiment, in which each of steps 416, 418 and 420 are performed. Operation proceeds from step 414 to step 416. In step 416, the access point measures, a temperature at the access point. Operation proceeds from step 416 to step 418. In step 418 the access point, determines a number of wireless transmitters to be powered on based on a traffic load to be communicated. In some embodiments, the determination of the number of wireless transmitter to be powered on is further based on the device capabilities of user devices to be serviced by the access point. Operation proceeds from step 418 to step 420. In step 420 the access point detects peripheral devices attached to the access point, Operation proceeds from step 420 to step 422.

In step 422 the access determines, based on the measured current, measured voltage, and information about power requirements of access point components or devices, e.g., peripheral devices, coupled to the access point a power requirement of the access point, said power requirement being an amount of power to be requested. In some embodiments, the devices coupled to the access point include one or more of: another PD, e.g., an additional PoE AP or another type of PoE coupled to the access point via a module port, one or more USB powered devices coupled to the access point via a USB port, or one or more Internet of Things (IoT) devices coupled to the access point via a IoT port.

In some embodiments, step 422 includes one or more, or all of steps 424, 426 and 428 In step 424 the access point determines the power requirement of the access point based on the measured temperature in addition to the measured current, measured voltage and the power requirements of access point components or devices coupled to the access point. In step 426 the access point determines the amount of power to be requested based on the determined number of wireless transmitters to be powered on In step 428 the access point determines the amount of power to be requested based on the peripheral devices which are detected as being attached to the access point, Operation proceeds from step 422, via connecting node A 430, to step 432. In step 432 the access point communicates, from the access point, at least one of the measured current and measured voltage or ii) measured power to the power sourcing equipment (PSE), wherein the measured power equals the measured voltage multiplied by the measured current. Operation proceeds from step 432 to step 434. In step 434 the access point communicate from the access point, a power request to the power sourcing equipment (PSE) indicating the determined power requirement. Operation proceeds from step 434 to step 436.

In step 436 the PSE determine at least one of: a current, a voltage or power to apply to the power lines used to supply power to the access point based on the requested amount of power and at least one of i) the communicated measured current and measured voltage or ii) the communicated measured power. For example, the PSE can take in consideration voltage drop/power loss on the line to determine the power to be applied at the PSE. e.g., the access point may not be aware of the amount of line loss, but once i). AP measured current and AP measured voltage or ii) AP measured power is reported to the PSE, the PSE can factor into its power calculations the power loss since the PSE measures voltage at its location on the lines being used to supply power to the AP. Operation proceeds from step 436 to step 438.

In step 438, the access point receives a response to said power request, said response being sent from said PSE. Operation proceeds from step 438 to step 440, In step 440 the access point determines if the received response indicates a power grant that is less than the determined amount of power that was previously requested by the access point If the access point determines the received response indicates a power grant that is less than the determined amount of power that was requested by the access point, then operation proceeds from step 440, to step 442: otherwise, operation proceeds from step 440, via connecting node B 446 to step 404.

In step 442 the access point selects one or more access point components or devices coupled to the access point to de-power, when said response from the PSE indicated a power grant less that the amount of power that was requested. Operation proceeds from step 442 to step 444. In step 444 the access point de-powers the selected one or more access point components or devices coupled to said access point. Operation proceeds from step 444, via connecting node B 446, to step 402. The access point proceeds through the steps of the flowchart again, repeating the previously described steps, e.g., including the steps of: measuring input current for the access point (repeat step 402), measuring voltage on a PoB power input of the access point (repeat step 404), determining based on the measured current, measured voltage, and information about power requirements of access point components or devices coupled to the access point, an amount of power to be requested (repeat step 422), communicating at least one of the measured current and measured voltage or ii) measured power to the power sourcing equipment (PSE) (repeat step 432), and communicating the power request to the PSE (repeat step 434), etc.

in various embodiments, the access point is a powered device (PD). In some such embodiments, the access point is powered by the PSE In some such embodiments, the PSE supports PoE plus (PoE+) and the access point is a PoE 4 device.

Figure 5A:
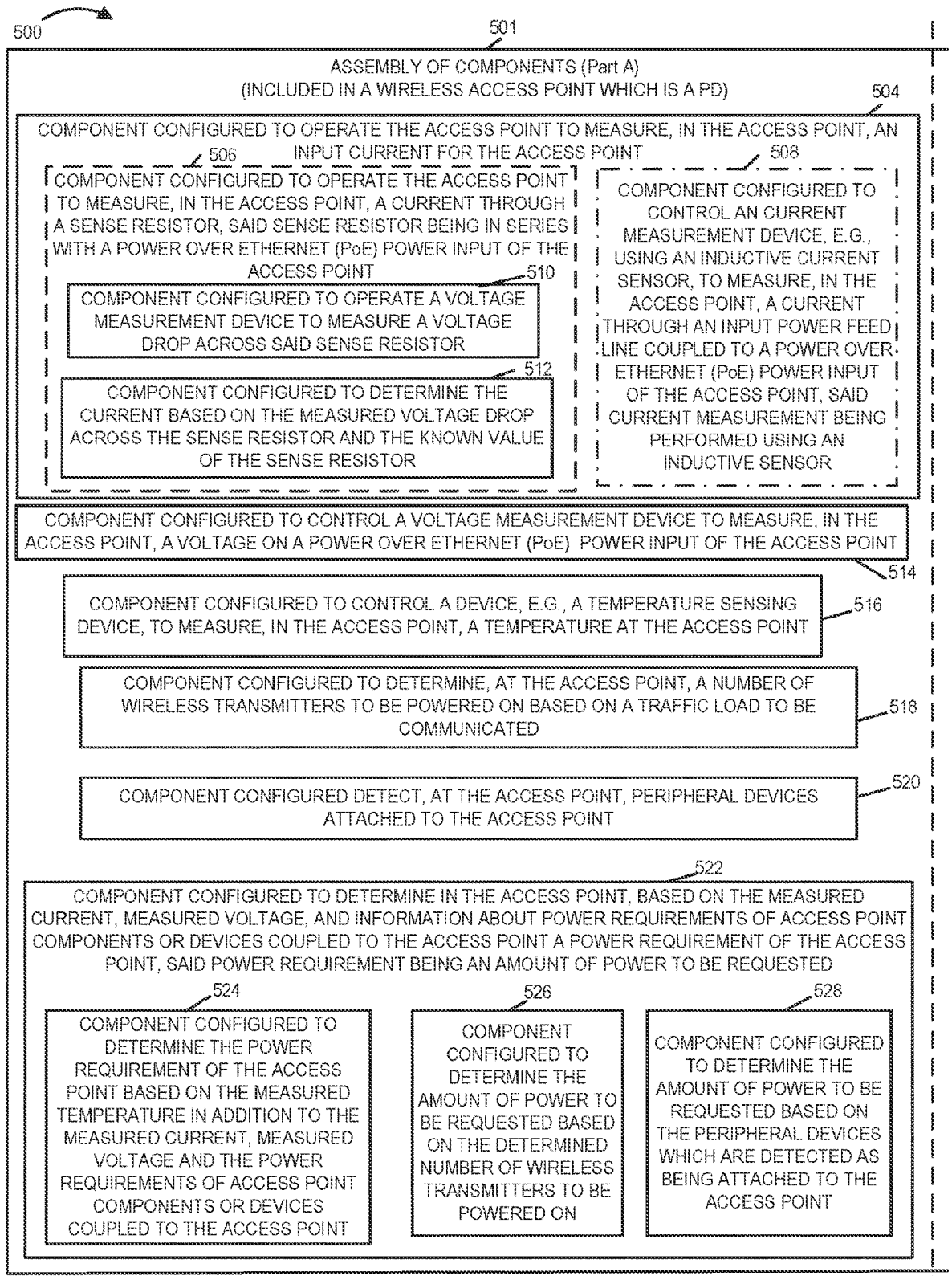
FIG. 5A is a drawing of a first part of art exemplary assembly of components which may be included in an exemplary wireless access point in accordance with an exemplary embodiment.
Figures 5, 5B:
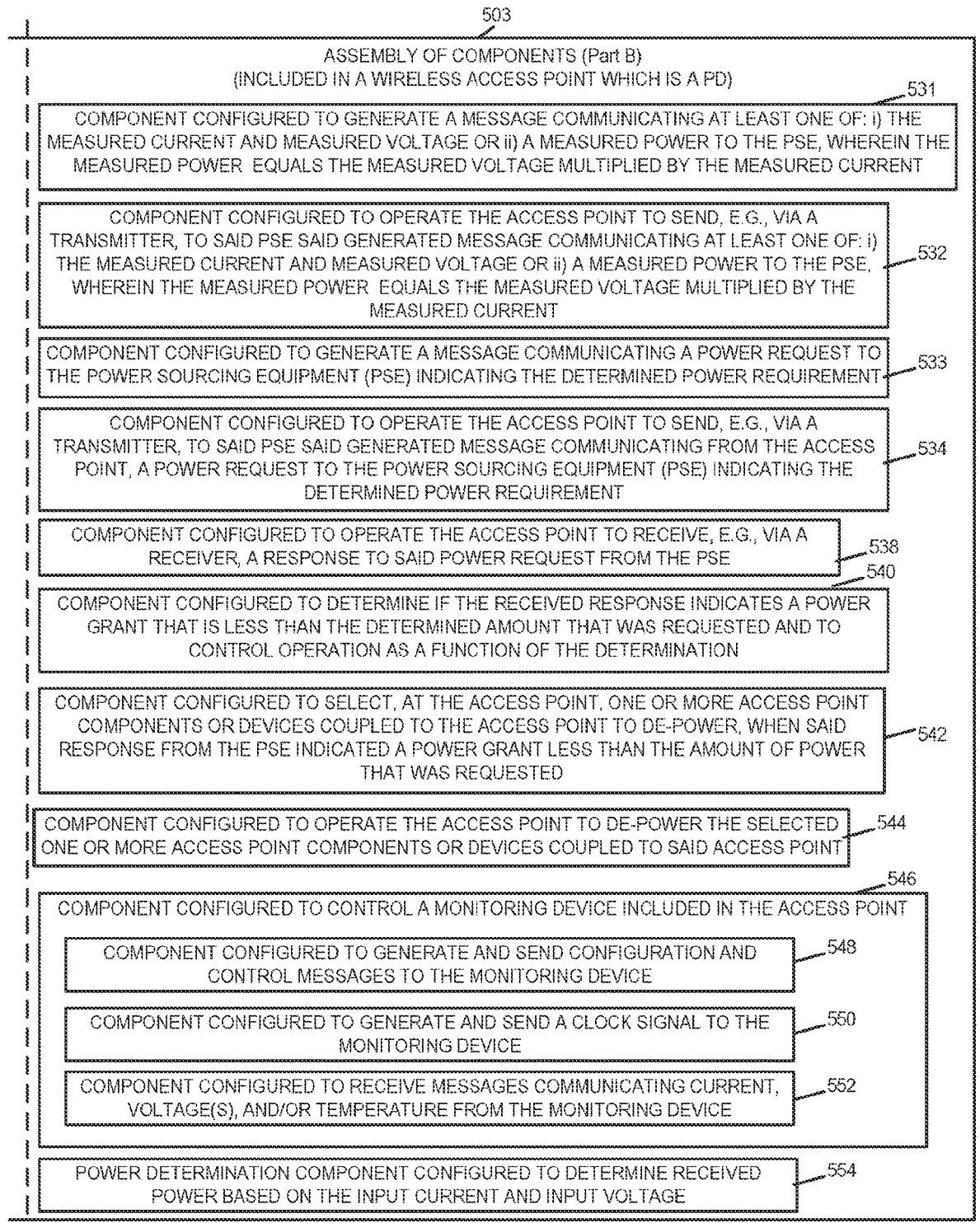
FIG. 5B is a drawing of a second part of an exemplary assembly of components, which may be included in an exemplary wireless access point in accordance with an exemplary embodiment.
FIG. 5 comprises the combination of FIG. 5A and FIG. 58.

FIG. 5, comprising the combination of FIG. 5A and FIG. 5B, is a drawing of an exemplary assembly of components 500, comprising part A 501 and Part B 503, which may be, and sometimes is, included in an exemplary wireless access point in accordance with an exemplary embodiment, Exemplary assembly of components 500, which may be included in a wireless access point which is a power device (PD) such any of the exemplary wireless access points (104, 106, 108, 110 of FIG. 1, wireless access point 202 of FIG. 2, and/or wireless access point 202' of FIG. 3, implement steps of an exemplary method, e g., steps of the method of the flowchart 400 of FIG. 4, which are performed by a wireless access point Assembly of components 500 can be, and in some embodiments is, used in a wireless access point of FIG. 1, e.g. wireless access point 1 104 of FIG. 1, warless access point 202 of FIG. 2 and/or wireless access point 202' of FIG.

3. The components in the assembly of components 500 can, and in some embodiments are, implemented fully in hardware within the processor 223, e.g., as individual circuits. The components in the assembly of components 500 can, and in some embodiments are, implemented fully in hardware within the assembly of components (AOC) 2231, e.g., as individual circuits corresponding to the different components. In other embodiments some of the components are implemented, e.g., as circuits, within the processor 223 with other components being implemented, e.g., as circuits within assembly of components 2231, external to and coupled to the processor 223. As should be appreciated the level of integration of components on the processor and/or with some components being external to the processor may be one of design choice Alternatively, rather than being implemented as circuits, all or some of the components may be implemented in software and stored in the memory 224 of the wireless access point, with the components controlling operation of the wireless access point to implement the functions corresponding to the components when the components are executed by a processor, e.g., processor 223. In some such embodiments, the assembly of components 500 is included in the memory 224. In still other embodiments, various components in assembly of components 500 are implemented as a combination of hardware and software, e.g., with another circuit external to the processor 223 providing input to the processor 223 which then under software control operates to perform a portion of a component's function. While processor 223 is shown in the FIGS. 2 and 3 embodiments as a single processor, e g., computer, it should be appreciated that the processor 223 may be implemented as one or more processors, e.g., computers.

When implemented in software the components include code, which when executed by the processor 223, configure the processor 223 to implement the function corresponding to the component. In embodiments where the assembly of components 500 is stored in the memory 224, the memory 224 is a computer program product comprising a computer readable medium comprising code, e.g., individual code for each component, for causing at least one computer, e.g., processor 223, to implement the functions to which the components correspond.

Completely hardware based or completely software based components may be used. However, it should be appreciated that any combination of software and hardware, e g., circuit implemented components may be used to implement the functions. As should be appreciated, the components illustrated in FIG. 5 control and/or configure the wireless access point, e.g., wireless access point 202 or 202' or elements therein such as the processor 223, to perform the functions of corresponding steps illustrated and/or described in the method of one or more of the flowcharts, signaling diagrams and/or described with respect to any of the FIGS. Thus the assembly of components 500 includes various components that perform functions of corresponding one or more described and/or illustrated steps of an exemplary method, e.g., steps of the method of flowchart 400 of FIG. 4 and/or described or shown with respect to any of the other figures. In some embodiments, some of the components included in assembly of components 500 are included in processor 253, memory 254, or in hardware components shown in FIG. 2 or FIG. 3.

Assembly of components 500 includes a component 504 configured to operate the access point to measure, in the access point, an input current for the access point. In some embodiments, e.g., the embodiment of FIG. 2 including wireless access point 202 which includes current sense resistor 235, component 504 includes a component 506 configured to operate the access point to measure, in the access point, a current through a sense resistor, said sense resistor being in series with a Power over Ethernet (PoE) power input of the access point. Component 506 includes a component 510 configured to operate a voltage measurement device, e.g., voltage measurement device 250, e.g., a voltage measurement circuit, to measure a voltage drop across said sense resistor, and a component 512 configured to determine the current based on the measured voltage, drop across the sense resistor and the known value (known resistance) of the sense resistor. In some embodiments, e.g., the embodiment of FIG. 3 including wireless access point 202' which includes inductive current sensor 235, component 504 includes a component 508 configured to control a current measurement device, e.g., current measurement device 2501, which uses inductive current sensor 235, to measure, in the access point, a current through an input power feed line coupled to a Power over Ethernet (PoE) power input of the access point.

Assembly of components 500 further includes a component 514 configured to control a voltage measure device, e.g., voltage measurement device 250 or 250', which may be a voltage measurement circuit, to measure, in the access point, a voltage on a PoE power input of the access point, e.g., with respect to PD IN ground, and a component 518 configured to control a device. e.g., a temperature sensing device 251, to measure in the access point a temperature at the access point.

Assembly of components 500 further includes a component 518 configured to determine a number wireless transmitters to be powered on based on a traffic load to be communicated, a component 520 configured to detect, at the access point, peripheral device(s) attached to the access point, e.g., based on input received from device detection circuits, sometimes referred to as external device sense circuits, 274, 276, 278.

Assembly of components 500 further includes a component 522 configured to determine in the access point, based on the measured current, measured voltage, and information about power requirements of access point components (e.g., including TX 2592, TX 2601, TX 2612, TX 2622) or devices (e.g., one or more of devices 259, 270, 271, 272, 283) coupled to the access point, a power requirement of the access point, said power requirement being an amount of power to be requested. Component 522 includes a component 524 configured to determine the power requirement of the access point based on the measured temperature in addition to the measured current, measured voltage and the power requirements of the access point or device coupled to the access point, a component 526 configured to determine the amount of power to be requested based on the number of wireless transmitters to be powered on 526, and a component 528 configured to determine the amount of power to be requested based on the peripheral devices which are detected as being attached to the access point.

Assembly of components 500 further includes a component 531 configured to generate a message communicating at least one of: i) the measured current and measured voltage or ii) a measured power to the PSE, wherein the measured power equals the measured voltage multiplied by the measured current, a component 532 configured to operate the access point to send, e.g., via a transmitter 222, to said PSE said generated message communicating at least one of: i) the measured current and the measured voltage or ii) a measured power to the PSE, wherein said measured power equals the measured voltage manipulated by the measured current, a component 533 configured to generate a message communicating a power request to the power sourcing equipment (PSE) indicating the determined power requirement, and a component 534 configured to operate the access point to send, e.g., via a transmitter 222, to said PSE said generated message communicating from the access point, a power request, to the power sourcing equipment (PSEs) indicating the determined power requirement.

Assembly of components 500 further includes a component 538 configured to operate the access point to receive, e.g., via a receiver 220, a response to said power request, said response sent from the PSE, said response including a power grant to the access point. Assembly of components 500 further includes a component 540 configured to determine if the received response indicates a power grant that is less than the determined amount that was request and to control operation as a function of the determination, a component 542 configured to select one or more access point components or devices coupled to the access point to de-power, when said response from the PSE indicated a power grant less than the amount of power that was requested, and a component 544 configured to operate the access point to de-power the selected one or more access point components or devices coupled to the access point.

Assembly of components 500 further includes a component 546 configured to control a monitoring device, e.g., monitoring device 228 or 228, included in the access point. Component 546 includes a component 548 configured to generate and send configuration and control messages to the monitoring device, a component 550 configured to generate and send a clock signal to the monitoring device, and a component 552 configured to receive messages communicating current, voltage and/or temperature from the monitoring device Assembly of components 554 further includes a component configured to determine received power based on the input current and input voltage.

Figure 6:
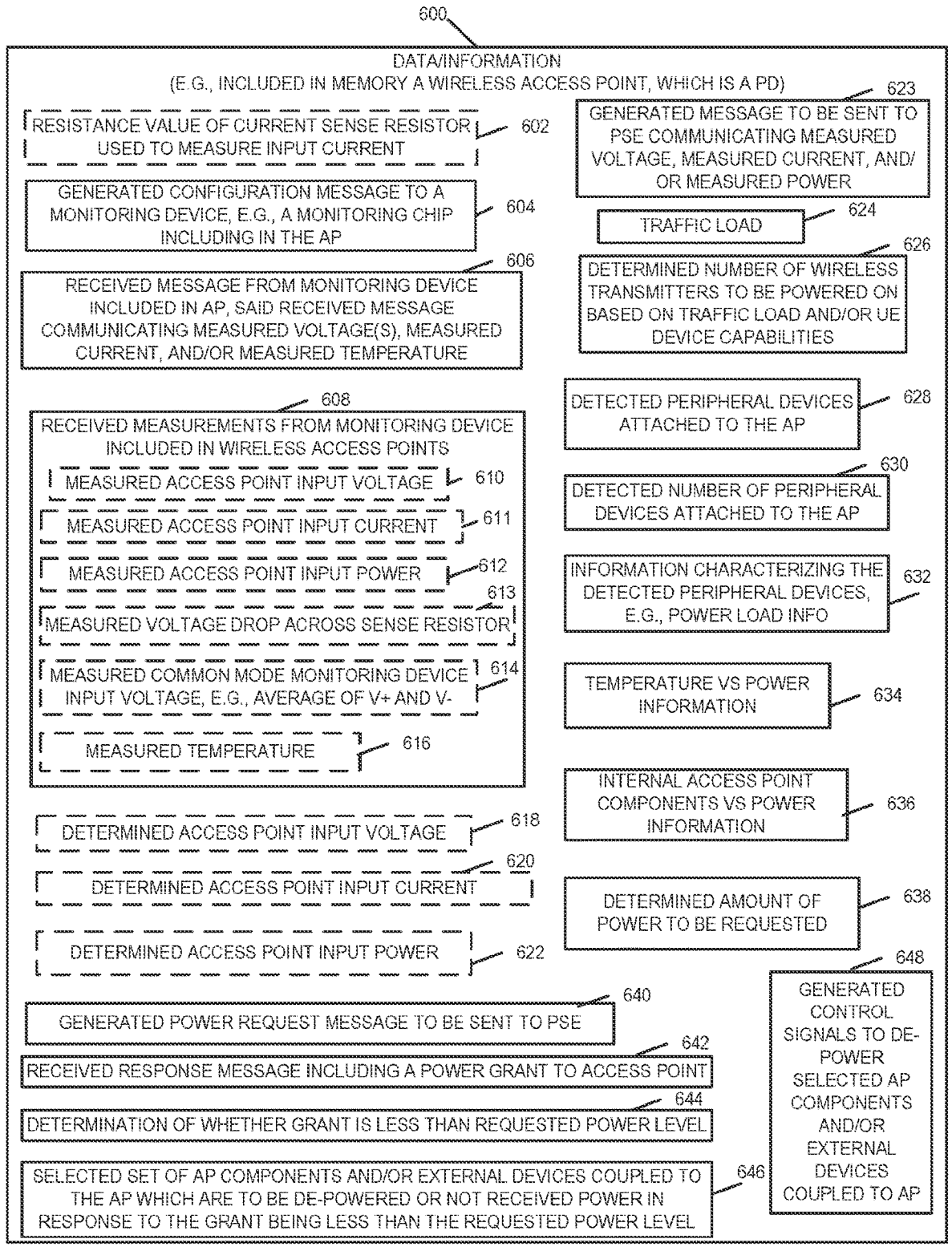
FIG. 6 is a drawing of exemplary data/information which may be included in a wireless access point in accordance with an exemplary embodiment.

FIG. 6 is a drawing of exemplary data/information 600 which may be included in an exemplary wireless access point in accordance with an exemplary embodiment. Data/information 600 is, e.g., included in memory 224 of wireless access point 202 of FIG. 2 or included in memory 224 of wireless access point 202' of FIG. 3.

Data/information 600 includes, in some embodiments, e.g., the embodiment of FIG. 2, a resistance value 602 of the current sense resistor included in the access point which is used to measure input current. Data/information 600 further includes a generated configuration message(s) to a monitoring device including in the access point, e.g., to a monitoring chip including in the AP. Exemplary information included in a configuration message includes, e.g., information identifying, specifying or selecting measurements to be performed by the monitoring device, e.g., input voltage measurement, input current measurement, voltage drop across a sense resistor coupled to the monitoring device, monitoring device input common mode voltage, temperature, power, etc., information identifying, specifying or selecting measurement rates, information identifying specifying or selecting information to be included in output messages including, e.g. a measured voltage drop across the sense resistor, a measured input current, a measured input voltage, a measured common, mode monitoring device input voltage, a measured temperature, etc., information identifying, specifying or selecting gain factors, e.g. scaling used in the messages, information identifying, specifying or selecting message format, and information identifying, specifying or selecting output message rate.

Data/information 600 further includes received message(s) 606 from the monitoring device included in the AP, said received messages communicating measured voltage(s) measured current, and/or measured temperature. In some embodiments, a received message 606 included measured input power, e g determined by the monitoring device, Data/information 600 further includes received measurements for the monitoring device included in the wireless access point 608, e.g., recovered from received messages 606. Received measurements 608 includes one or more or all of measured access point input voltage 610, measured access point input current 611, measured access point input power 612, measured access point voltage drop across the sense resistor 613, measured common mode monitoring device input voltage 614, e.g., the average of the voltage on monitoring device V4 input and the voltage on monitoring device V- input, and measured temperature of the AP 616. In some embodiments, data/information 600 further includes one or more or all of: a determined access point input voltage 618, e.g., determined by the AP based on a measured common mode monitoring device input voltage and the determined input current, a determined access point input current 620, e.g., determined by the AP based on the measured voltage drop across the sense resistor reported by the monitoring device and the known resistance value of the sense resistor, and a determined access point input power 622, e.g. determined by the access point by multiplying the measured input current by the measured input voltage.

Data/information 600 further includes a generated message 623 to be sent to the PSE communicating measured voltage, measured current, and/or measured power, a determined or estimated traffic load 624, a determined number of wireless transmitters to be powered on 626 based on the traffic load and/or based on device capabilities of UEs connected to the AP, information identifying detected peripheral devices attached to the AP 628, a detected number of peripheral devices attached to the AP 630, information characterizing the detected peripheral devices, e.g., including power load information, temperature vs power information 634, e.g., to be used in the power request determination with the measured temperature, internal access point components vs power information 636, e.g., information specifying amounts of power corresponding to one or more internal AP components such as wireless radios or wireless transmitters included in wireless radios, which may be, and sometimes are, selectively de-powered.

Data/information 600 further includes a determined amount of power to be requested 638, a generated power request message 640 to be sent to the PSE, a received response message from the PSE including a power grant to the AP 642, a determination as to whether or not the grant is less than the requested power level 644, a selected set of access point components and/or external devices coupled to the AP, which are to be de-powered or not received power, in response to the grant being less than the requested power level, and generated control signals to de-power selected AP components and/or external devices coupled to the access point 648

Figure 7:
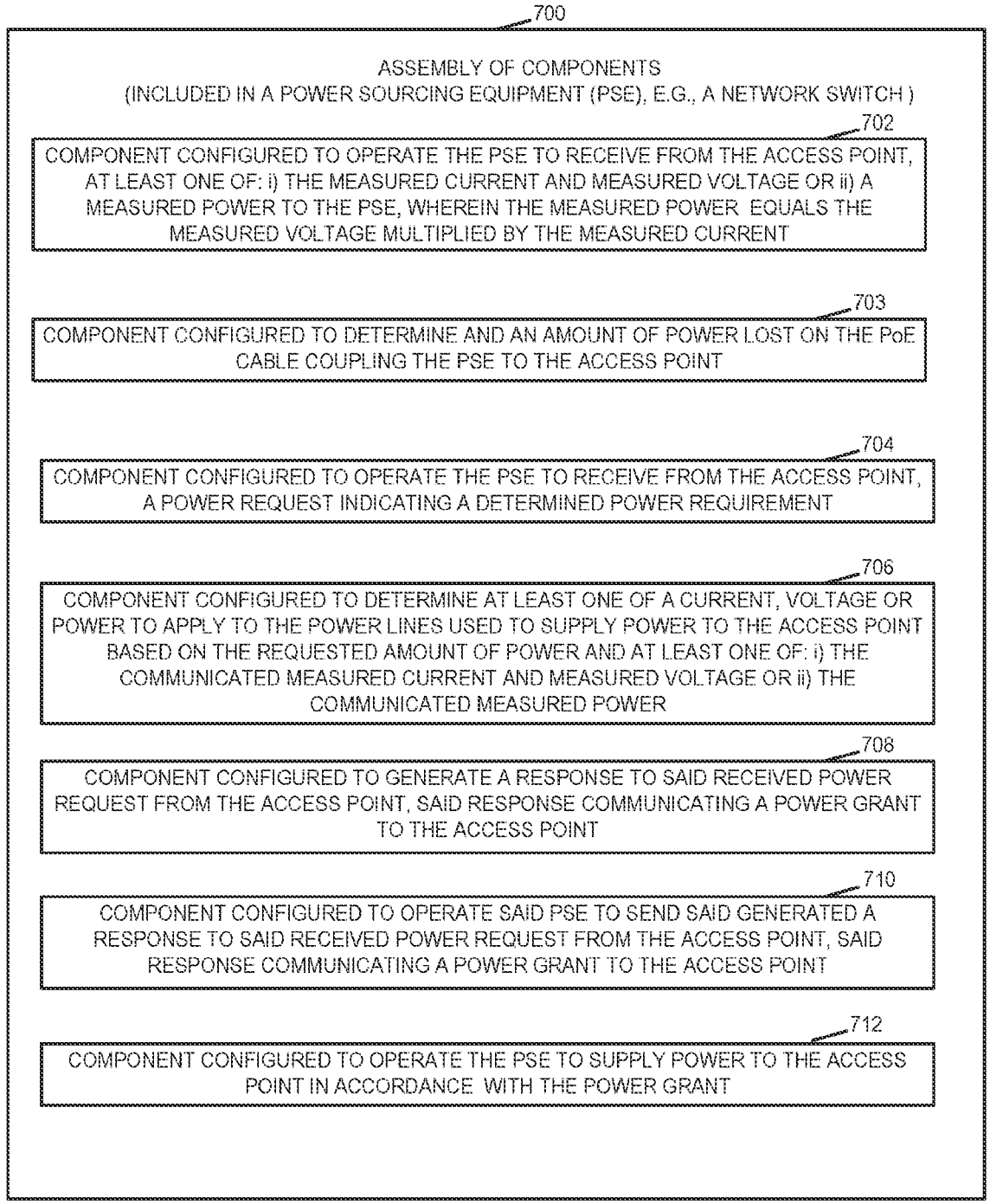
FIG. 7 is a drawing of an exemplary assembly of components, which may be included in an exemplary wireless access point in accordance with an exemplary embodiment.

FIG. 7 is a drawing of an exemplary assembly of components 700 which may be, and sometimes is, included in an exemplary power sourcing equipment (PSE), e.g., a network switch, in accordance with an exemplary embodiment. FIG. 7 is a drawing of an exemplary assembly of components 700, which may be, and sometimes is, included in an exemplary Power Sourcing Equipment (PSE), e.g., a network switch, in accordance with an exemplary embodiment. Exemplary assembly of components 700, which may be included in a PSE such PSE 101 of FIG. 1 and/or PSE 20) of FIGS. 2 and 3, implement steps of an exemplary method, e.g., steps of the method of the flowchart 400 of FIG. 4, which are performed by a power serving equipment and/or described with respect to any of the FIGS.

Assembly of components 700 can be, and in some embodiments is, used in a PSE 101 of FIG. 1 and/or PSE 20I of FIG. 2 or FIG. 3. The components in the assembly of components 700 can, and in some embodiments are, implemented fully in hardware within the processor 208, e.g., as individual circuits. The components in the assembly of components 700 can, and in some embodiments are, implemented fully in hardware within the assembly of components (AOC) 2018, e.g., as individual circuits corresponding to the different components. In other embodiments some of the components are implemented, e.g., as circuits, within the processor 2018 with other components being implemented, e.g., as circuits within assembly of components 2018, external to and coupled to the processor 208. As should be appreciated the level of integration of components on the processor and/or with some components being external to the processor may be one of design choice. Alternatively, rather than being implemented as circuits, all or some of the components may be implemented in software and stored in the memory 209 of the power sourcing equipment, with the components controlling operation of the PSE to implement the functions corresponding to the components when the components are executed by a processor, e.g., processor 208. In some such embodiments, the assembly of components 700 is included in the memory 209 In still other embodiments, various components in assembly of components 700 are implemented as a combination of hardware and software, e.g., with another circuit external to the processor 208 providing input to the processor 208 which then under software control operates to perform a portion of a component's function. While processor 208 is shown in the FIGS. 2 and 3 embodiments as a single processor, e.g., computer, it should be appreciated that the processor 208 may be implemented as one or more processors, e.g., computers.

When implemented in software the components include code, which when executed by the processor 208, configure the processor 208 to implement the function corresponding to the component. In embodiments where the assembly of components 700 is stored in the memory 209, the memory 209 is a computer program product comprising a computer readable medium comprising code, e.g., individual code for each component, for causing at least one computer, e.g., processor 208, to implement the functions to which the components correspond Completely hardware based or completely software based components may be used. However, it should be appreciated that any combination of software and hardware, e.g., circuit implemented components may be used to implement the functions. As should be appreciated, the components illustrated in FIG. 7 control and/or configure power sourcing equipment, e.g., PSE 101 or PSE 201 or elements therein such as the processor 208, to perform the functions of corresponding steps illustrated and/or described in the method of one or more of the flowcharts, signaling diagrams and/or described with respect to any of the FIGS. Thus the assembly of components 700 includes various components that perform functions of corresponding one or more described and/or illustrated steps of an exemplary method, e.g., steps of the method of flowchart 400 of FIG. 4 and/or described or shown with respect to any of the other figures.

Assembly of comments 700 further includes a component 702 configured to operate the PSE to receive, e.g., via receiver 207, from the access point, at least one of i) the measured current and measured voltage ir ii) a measured power to the PSE, wherein the measured power equals the measured current multiplied by the measured voltage, a component 703 configured to determine an amount of power lost on the PoE cable (e.g., power loss over power lines (282, 283, 284, 285) of PoE cable 203) coupling the PSE to the access point, e.g., based on received voltage, current, and/or power measurement information from the access point and known power supply output information at the PSE, and component 704 configured to operate the PSE to receive, e.g., via receiver 207, from the access point, a power request indicating a determined power requirement. Assembly of components 700 further includes a component 706 configured to determine at least one of a current, voltage or power to apply to the power lines used to supply power to the access point based on the request amount of power and at least one of: the communicated measured current and measured voltage or ii) the communicated measured power. Assembly of components 700 further includes a component 708 configured to generate a response to said received power request from the access point, said response communicating a power grant to the access point, and a component 710 configured to operate the PSE to send, e.g., via transmitter 205, said generated response to said received power request from the access point, said response communicating a power grant to the access point, Assembly of components 712 further includes a component 712 configured to operate the PSE, e.g., control DC power supply 206, to supply power to the access point in accordance with the power grant. In some embodiments controlling the DC power supply includes adjusting the voltage level across the B+(213/214) with respect to B−(215/216).

Figure 8:
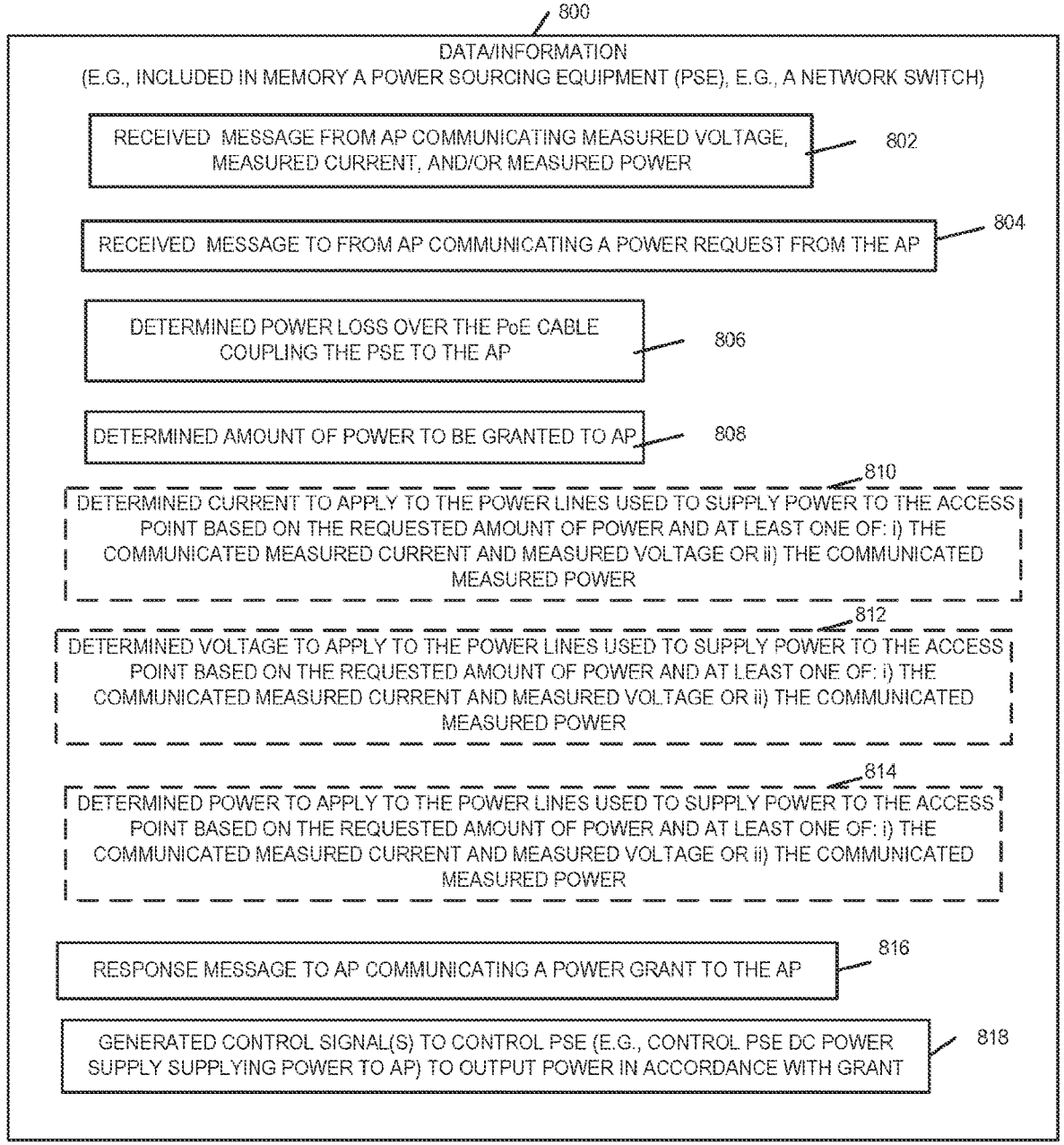
FIG. 8 is a drawing of exemplary data information which may be included in an exemplary power sourcing equipment (PSE), e.g., a network switch, in accordance with an exemplary embodiment.

FIG. 8 is a drawing of exemplary data/information which may be included in an exemplary power sourcing equipment (PSE), e.g., a network switch, in accordance with an exemplary embodiment. Data/information 800 is, e.g., included in memory 209 of PSE 201 of FIG. 2 or FIG. 3.

Data/information 800 includes a received message from an access point communicating measured voltage, measured current and/or measured power 802, e g, communicating access point measured voltage across its-input power lines, access point measured input current, and/or access point measured received power.

Data/information 800 further includes a received message from the access point communicating a power request from the access point 804, a determined power loss over the PoE cable coupled the PSE to the access point 806, and a determined amount of power to be granted to the access point 808.

In some embodiments, data/information 800 includes a determined current to apply to the power lines, e.g., current to sent into one or more B+ lines to the AP, to supply power to the access point based on the requested amount of power and at least one of: i) the communicated measured current and voltage or ii) the communicated measured power 810. In some embodiments, data/information 800 includes a determined current to voltage to the power lines, e.g., voltage to be applied across the B+ line(s) with respect to the B− line(s) coupled to the AP, to supply power to the access point based on the requested amount of power and at least one of: i) the communicated measured current and voltage or ii) the communicated measured power 812. In some embodiments, data/information 800 includes a determined power to apply to the power lines, to supply power to the access point based on the requested amount of power and at least one of, i) the communicated measured current and voltage or xi) the communicated measured power 814.

Data/information 800 further includes a response message to the access point communicating a power grant to the access point 816, and generated control signal(s) to control the PSE to output power toward the access point in accordance with the grant, e.g., control signals to control the PSE, power supply 206 to supply power to the AP iv accordance with the grant.

The PSE, e.g., a PoE switch, receives the PoE power request from one or more PDs and, in some cases, the measured line voltage, current, and/or temperature at the requesting device The PSE takes into consideration the received measurement information, e.g., voltage at the PD, current at the PD, and/or temperature. In some embodiments the PSE estimates the amount of power loss to the device due to transmission loss and takes this into consideration when determining the amount of power to be supplied to the requesting device, for example, the amount of power expected to be lost due to transmission may be added to the amount of power requested when determining the requesting PDs actual power needs.

Based on the amount of power available at the PSE, the requested amount of power and reported measurement information from one or more PDs, the PSE determines the amount of power to be provided to individual PDs requesting power. In some cases, depending on the priority of the device and/or the number of devices requesting power, the PSE may or may not grant a PD all the power it is requesting.

The amount of power granted to individual PDs is communicated from the PSE to the PDs to which power grants are made. The power grant may, and in some embodiments does, not take into consideration the amount of power the PD allocated to transmission loss. The amount of power indicated as being granted to a PD that is subject to a large transmission loss may be lower, e.g., one or several watts lower, than the actual amount of power allocated by the PSE. In this way. PDs can make power requests based on their actual expected needs, potentially plus some safety factor, without having to worry if they will suffer from extensive transmission power loss due to whether they are connected to the PSE by a short or long set of lines.

Numbered List of Exemplary Method Embodiments

Method Embodiment 1 A method, the method comprising, measuring (404), in an access point, an input current for the access point measuring (414), in the access point, a voltage on a Power Over Ethernet (PoE) power input of the access point, determining (422), in the access point, based on the measured current, measured voltage, and information about power requirements of access point components or devices (e.g., peripheral devices) coupled to the access point a power requirement of the access point, said power requirement being an amount of power to be requested; and communicating (434), from the access point, a power request to a Power Sourcing Equipment (PSE) indicating the determined power requirement.

Method Embodiment 2 The method of Method Embodiment 1, wherein measuring (404), in an access point, an input current for the access point includes: measuring (406), in the access point, a current through a sense resistor, said sense resistor being in series with a Power over Ethernet (PoE) power input of the access point.

Method Embodiment 3 The method of Method Embodiment 1, wherein measuring (402), in an access point, an input current for the access point includes: measuring (408), in the access point, a current through an input power feed line coupled to a Power over Ethernet (PoE) power input of the access point said current measurement being performed using an inductive sensor.

Method Embodiment 4 The method of Method Embodiment 1, wherein said access point is a Powered Device (PD).

Method Embodiment 5 The method of Method Embodiment 4, wherein said access point is powered by said PSE.

Method Embodiment 6 The method of Method Embodiment 5, wherein said PSE supports PoE+, and wherein said access point is a PoE+ device.

Method Embodiment 7 The method of Method embodiment 2, wherein measuring (406) a current through a sense resistor includes: measuring (410) a voltage drop across said sense resistor; and determining (412) the current based on the measured voltage drop across the sense resistor and the known value of the sense resistor.

Method Embodiment 8 The method of Method Embodiment 1, wherein said devices coupled to said access point include: one or more of other powered PDs (an additional PoE APs or a different type of PoE device), USB powered devices, and internet of Things (IoT) devices.

Method Embodiment 9 The method of Method Embodiment 1, further comprising: measuring (416), in the access point, a temperature at the access point; and wherein determining (422), a power requirement at the access point includes determining (424) the power requirement of the access point based on the measured temperature in addition to the measured current, measured voltage, and the power requirements of access point components or devices coupled to the access point Method Embodiment 10 The method of Method Embodiment 1, further comprising: communicating (432), from the access point, at least one of, i) the measured current and measured voltage or ii) a measured power to the PSE, wherein said measured power equals the measured voltage multiplied by the measured current:

Method Embodiment 11 The method of Method Embodiment 10 further comprising, operating (436) the PSE to determine at least one of a current, voltage, or power to apply to power lines used to supply power to the access point based on the requested amount of power and one of: i) the communicated measured current and measured voltage or ii) the communicated measured power. (PSE can take into consideration voltage drop/power loss on line to determine the power to be applied at the PSE, e.g., the access point may not be aware of the amount of line loss but once i) access point measured voltage and current or ii) access point measured power is reported to the PSE, the PSE can factor into its power calculations the power loss since the PSE measures voltage at its location on the lines being used to supply power to the AP).

Method Embodiment 12 The method of Method Embodiment 1, further comprising: determining (418), at the access point, a number of wireless transmitters to power on based on a traffic load to be communicated, and wherein said step of determining (422) the amount of power to be requested is further based on the determined number of wireless transmitters to be powered on (426).

Method Embodiment 13 The method of Method Embodiment 12, further comprising: detecting (420), at the access point, peripheral devices attached to said access point; and wherein said step of determining (422) the amount of power to be requested is further based on the peripheral devices which are detected as being attached to said access point (428).

Method Embodiment 14 The method of Method Embodiment 9, further comprising: receiving (228), at the access point, a response to said power request, from the PSE; and selecting (442), at the access point, one or more access point components or devices coupled to the access point to de-power when said response to said power request from the PSE indicated a power grant that is less than the determined amount of power that was requested Method Embodiment 15 The method of Method Embodiment 14, further comprising: operating (444) the access point to de-power the selected one or more access point components or devices coupled to the access point.

Method Embodiment 16 The method of Method Embodiment 9, further comprising: repeating said steps of measuring (repeat 402), in said access point, an input current, measuring (repeat 404), in the access point, a voltage on the PoE input of the access point; determining (repeat 422), in the access point, based on the measured current, measured voltage, and information about power requirements of access point components or devices (e.g. peripheral devices) coupled to the access point a power requirement of the access point, said power requirement being an amount of power to be requested; and communicating (repeat 434), from the access point, a power request to the Power Sourcing Equipment (PSE) indicating the determined power requirement.

Numbered List of Exemplary Apparatus Embodiments

Apparatus Embodiment 1 An access point (104 or 202 or 202') comprising: a plurality of wireless interfaces (259, 260, 261, 262); a Power over Ethernet (PoE) power input (238/239); one of a: current sense resistor (235) or an inductive current sensor (235') for measuring the input current (UN 298) to the access point provided via the POE power input (2381239), a voltage measurement device (250 or 250') for measuring at least one of: i) a voltage (VIN 298) on a Power Over Ethernet (PoE) power input (238/239) of the access point (e.g., with respect a PoE power input low side (240/241) and/or PD input ground (291)) or ii) a voltage drop (e.g., (value at V+)–(value at V–)) across said sense resistor (235), a processor (223) configured to determine, in the access point, based on the measured current, measured voltage, and information about power requirements of access point components or devices (e g, peripheral devices) coupled to the access point a power requirement of the access point, said power requirement being an amount of power to be requested; and an interface (219) for communicating (434), from the access point, a power request to a Power Sourcing Equipment (PSE) (201), the power request indicating the determined power requirement.

Apparatus Embodiment 2 The access point (104 or 202 or 202') of Apparatus Embodiment 1, further comprising: a monitoring device (228 or 228'), and wherein said monitoring device (228 or 228') includes said voltage measurement device (250 or 250').

Apparatus Embodiment 3 The access point (104 or 202 or 202') of Apparatus Embodiment 2, wherein said monitoring device (228 or 228') is an integrated circuit chip (e.g., chip including a high side current-sense amplifier with an integrated ADC and a gain block).

Apparatus Embodiment 4 The access point (104 or 202') of Apparatus Embodiment 2, wherein said monitoring device (228') further includes: a current measurement device (2501) (e.g., current measurement circuitry coupled to said inductive current sensor (235')).

Apparatus Embodiment 5 The access point (104 or 202 or 202') of Apparatus Embodiment L, further comprising, a temperature sensor (251), in the access point, for measuring a temperature at the access point; and wherein the processor (223) is further configured to use the measured temperature when determining the power requirement at the access point in addition to the measured current, measured voltage, and the power requirements of access point components or devices coupled to the access point, Apparatus Embodiment 6 The access point (104 or 202 or 202') of Apparatus Embodiment 1, further comprising: a transmitter (222) for transmitting signals through said interface (219); wherein said interface (219) is a POE interface (e.g., a PoE+ interface); and wherein the processor (223) is further configured to control the transmitter (222) to send from the access point, at least one of: i) the measured current and measured voltage or ii) a measured power to the PSE, wherein said measured power equals the measured voltage multiplied by the measured current.

Apparatus Embodiment 7 The access point (104 or 202 or 202') of Apparatus Embodiment 6, wherein the processor (223) is further configured to: determine a number of wireless transmitters (2592, 2602, 2612, 2622) to power on based on a traffic load to be communicated; and use the number of wireless transmitters to be powered on as part of determining the amount of power to be requested.

Apparatus Embodiment 8 The access point (104 or 202 or 202') of Apparatus Embodiment 7, further comprising: a receiver (220) for receiving a response from the PSE (201) to said power request; and wherein the processor (223) is further configured to select, at the access point, one or more access point components (2592, 2602, 2612, 2622) or devices (269, 270, 271, 272, 273) coupled to the access point to de-power when said response to said power request from the PSE indicated a power grant that is less than the determined amount of power that was requested.

Apparatus Embodiment 9 The access point (104 or 202 or 202') of Apparatus Embodiment 7, wherein the processor (223) is further configured to: de-power the selected one or more access point components or devices coupled to the access pint.

Numerous variations on the above described methods and apparatus are possible.

The techniques of various embodiments may be implemented using software, hardware and/or a combination of software and hardware Various embodiments are directed to apparatus. e.g., Power Sourcing Equipments (PSEs). e.g., network switches supporting Power over Ethernet, PoE powered devices, such as wireless access points, base stations, PoE cables, etc, and communications systems, Various embodiments are also directed to methods, e.g., method of controlling and/or operating a communications device or devices, e.g., PD such as a wireless access point, a PSE such as a network switch, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method, It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure The accompanying method claims present elements of the various steps in a sample order, and are not meant to be limited to the specific order or hierarchy presented, In various embodiments devices and nodes described herein are implemented using one or more components to perform the steps corresponding to one or more methods, for example, input voltage measurement at an PoE input of a wireless AP, which is a PD, input current measurement of the current being received at the wireless AP, which is a PD, power measurement, determination of required power for a P), determination of the number of wireless transmitters in an AP to be powered on, determination of the number of external devices coupled to an access point which are to be powered via the access point, determination as to whether or not an AP has received the previously requested amount of power in a response including a power grant, determination of cable power loss by a PSE, determination of an amount of power to be granted to a PD by an PSE, selection of components or devices to de-power within a PD in response to a power grant being less than a request, controlling power at the PSE taking inti account power loss over the PoE cable and reported measured power at the PD, signal generation, transmitting, processing, analyzing, and/or receiving steps. Thus, in some embodiments various features are implemented using components. Such components may be implemented using software, hardware or a combination of software and hardware. In some embodiments each component is implemented as an individual circuit with the device or system including a separate circuit for implementing the function corresponding to each described component. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the invention.

In some embodiments, the processor or processors, e.g., CPUs, of one or more devices, e.g., communications devices such as wireless access points, which are PoE PD devices, or PSE devices, such as network switches supporting PoE, are configured to perform the steps of the methods described as being performed by the devices. The configuration of the processor may be achieved by using one or more components, e g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a component corresponding to each of the steps of the various described methods performed by the device in which the processor is included. The components may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts aid/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless access point which is a PoE PD, a PSE such as a network switch, which supports PoE, a communications system in which PoE is used, etc. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application While described in the context of a communications system including cellular, WiFi, Bluetooth and BLE, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM),. WiFi, Bluetooth. BLE, and/or various other types of communications techniques which may be used to provide wireless communications links between access nodes and wireless nodes. In some embodiments the access nodes are implemented as base stations which establish communications links with user equipment devices, e.g., mobile nodes, using WiFi, Bluetooth, BLE, OFDM and/or CDMA. In various embodiments the wireless nodes are implemented as notebook computers, personal data assistants (PDAs), or other portable devices including receiver/transmitter circuits and logic and/or routines, for implementing the methods.

What is claimed is:

1. A method, comprising:
computing, by power sourcing equipment, an estimated amount of power loss to an Access Point (AP) due to transmission loss on a Power over Ethernet (PoE) cable coupling the power sourcing equipment to the AP;
responsive to an expected amount of power requested by the AP, determining, by the power sourcing equipment, an amount of power to be provided to the AP based on the expected amount of power requested by the AP, an available amount of power at the power sourcing equipment, and the estimated amount of power loss, wherein the expected amount of power requested by the AP is determined by the AP; and supplying, by the power sourcing equipment, power to the AP in accordance with the amount of power to be provided to the AP.

2. The method of claim 1, wherein the expected amount of power requested by the AP includes an input current on a PoE power input of the AP and a voltage on the PoE power input of the AP.

3. The method of claim 1, wherein the expected amount of power requested by the AP is based on a temperature at the AP.

4. The method of claim 1, wherein the power sourcing equipment includes a PoE network switch.

5. The method of claim 1, further comprising:
generating, by the power sourcing equipment and for receipt by the AP, a response to the expected amount of power requested by the AP indicating the amount of power determined by the power sourcing equipment to be provided to the AP.

6. The method of claim 1, further comprising:
determining, by the power sourcing equipment, that the expected amount of power requested by the AP is greater than the available amount of power at the power sourcing equipment and the estimated amount of power loss; and
generating, by the power sourcing equipment, a response to the expected amount of power requested by the AP indicating the amount of power to be provided to the AP that is less than the amount of power requested by the AP.

7. The method of claim 1, wherein supplying, by the power sourcing equipment, power to the AP further comprises controlling a DC power supply to supply power to the AP in accordance with the amount of power to be provided to the AP.

8. A system comprising:
a memory; and
processing circuitry coupled to the memory and configured to:
compute an estimated amount of power loss to an Access Point (AP) due to transmission loss on a Power over Ethernet (PoE) cable coupling power sourcing equipment to the AP;
responsive to an expected amount of power requested by the AP, determine an amount of power to be provided to the AP based on the expected amount of power requested by the AP, an available amount of power at the power sourcing equipment, and the estimated amount of power loss, wherein the expected amount of power requested by the AP is determined by the AP; and
supply power to the AP in accordance with the amount of power to be provided to the AP.

9. The system of claim 8, wherein the expected amount of power requested by the AP includes an input current on a PoE power input of the AP and a voltage on the PoE power input of the AP.

10. The system of claim 8, wherein the expected amount of power requested by the AP is based on a temperature at the AP.

11. The system of claim 8, wherein the power sourcing equipment includes a PoE network switch.

12. The system of claim 8, wherein the processing circuitry is further configured to:
generate, for receipt by the AP, a response to the expected amount of power requested by the AP indicating the amount of power determined by the power sourcing equipment to be provided to the AP.

13. The system of claim 8, wherein the processing circuitry is further configured to:
determine that the expected amount of power requested by the AP is greater than the available amount of power at the power sourcing equipment and the estimated amount of power loss; and
generate a response to the expected amount of power requested by the AP indicating the amount of power to be provided to the AP that is less than the expected amount of power requested by the AP.

14. The system of claim 8, wherein to supply power to the AP the processing circuitry is further configured to control a DC power supply to supply power to the AP in accordance with the amount of power to be provided to the AP.

15. Non-transitory computer-readable media comprising instructions that when executed by processing circuitry cause the processing circuitry to:
compute an estimated amount of power loss to an Access Point (AP) due to transmission loss on a Power over Ethernet (PoE) cable coupling power sourcing equipment to the AP;
responsive to an expected amount of power requested by the AP, determine an amount of power to be provided to the AP based on the expected amount of power requested by the AP, an available amount of power at the power sourcing equipment, and the estimated amount of power loss, wherein the expected amount of power requested by the AP is determined by the AP; and
supply power to the AP in accordance with the amount of power to be provided to the AP.

16. The non-transitory computer-readable media of claim 15, wherein the expected amount of power requested by the AP includes at least one of an input current on a PoE power input of the AP, a voltage on the PoE power input of the AP, or a temperature at the AP.

17. The non-transitory computer-readable media of claim 15, wherein the power sourcing equipment includes a PoE network switch.

18. The non-transitory computer-readable media of claim 15, further comprising instructions that when executed by the processing circuitry cause the processing circuitry to:
determine that the expected amount of power requested by the AP is greater than an amount of power available at power sourcing equipment and the estimated amount of power loss; and
generate a response to the expected amount of power requested by the AP indicating the amount of power to be provided to the AP that is less than the expected amount of power requested by the AP.

* * * * *